US012739748B2

(12) United States Patent
Ajami et al.

(10) Patent No.: US 12,739,748 B2
(45) Date of Patent: Sep. 15, 2026

(54) TARGET WAKEUP TIME ELEMENT EXTENSIONS

(71) Applicant: QUALCOMM Incorporated, San Diego, CA (US)

(72) Inventors: Abdel Karim Ajami, Lakeside, CA (US); Abhishek Pramod Patil, San Diego, CA (US); George Cherian, San Diego, CA (US); Sai Yiu Duncan Ho, San Diego, CA (US); Alfred Asterjadhi, San Diego, CA (US); Gaurang Naik, San Diego, CA (US); Yanjun Sun, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 285 days.

(21) Appl. No.: 17/892,021

(22) Filed: Aug. 19, 2022

(65) Prior Publication Data

US 2024/0064633 A1 Feb. 22, 2024

(51) Int. Cl.
*H04W 52/02* (2009.01)
*H04L 27/26* (2006.01)

(52) U.S. Cl.
CPC ..... *H04W 52/0216* (2013.01); *H04L 27/2602* (2013.01)

(58) Field of Classification Search
CPC ......... H04W 52/0216; H04W 52/0219; H04W 84/12; H04L 27/2602
See application file for complete search history.

(56) References Cited

U.S. PATENT DOCUMENTS

| | | | | |
|---|---|---|---|---|
| 9,326,234 | B2 | 4/2016 | Chu et al. | |
| 11,228,963 | B2 | 1/2022 | Patil et al. | |
| 11,490,331 | B2 | 11/2022 | Cariou et al. | |
| 2020/0137612 | A1* | 4/2020 | Li | H04W 28/0221 |
| 2021/0014911 | A1* | 1/2021 | Patil | H04W 76/15 |
| 2021/0306955 | A1 | 9/2021 | Han et al. | |
| 2022/0132428 | A1 | 4/2022 | Hu | |
| 2023/0239798 | A1* | 7/2023 | Shafin | H04W 52/0235 370/338 |
| 2024/0090033 | A1* | 3/2024 | Huang | H04W 74/0816 |
| 2024/0244656 | A1* | 7/2024 | Baek | H04W 52/0248 |

FOREIGN PATENT DOCUMENTS

| | | | |
|---|---|---|---|
| WO | 2022132030 | A1 | 6/2022 |
| WO | 2022260351 | A1 | 12/2022 |

OTHER PUBLICATIONS

International Search Report and Written Opinion—PCT/US2023/070725—ISA/EPO—Nov. 13, 2023.

Hu C., et al., "Restricted TWT Spec Text Resolving TBDs: Part 1", IEEE 802.11-21/462, Mar. 2021, pp. 1-7.

* cited by examiner

*Primary Examiner* — Jung H Park
(74) *Attorney, Agent, or Firm* — Patterson + Sheridan, L.L.P.

(57) ABSTRACT

Certain aspects of the present disclosure provide method of wireless communication at a first station, comprising transmitting a first element that indicates one or more target wakeup time (TWT) parameter sets and transmitting a second element that provides information associated with at least one of the one or more TWT parameter sets indicated in the first element.

36 Claims, 20 Drawing Sheets

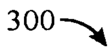
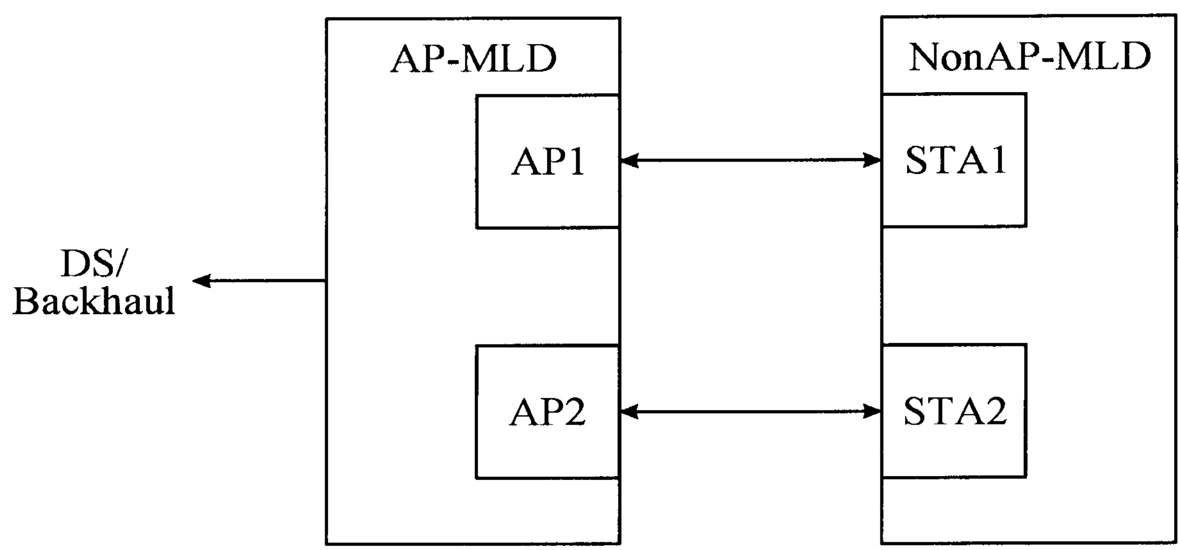
FIG. 3

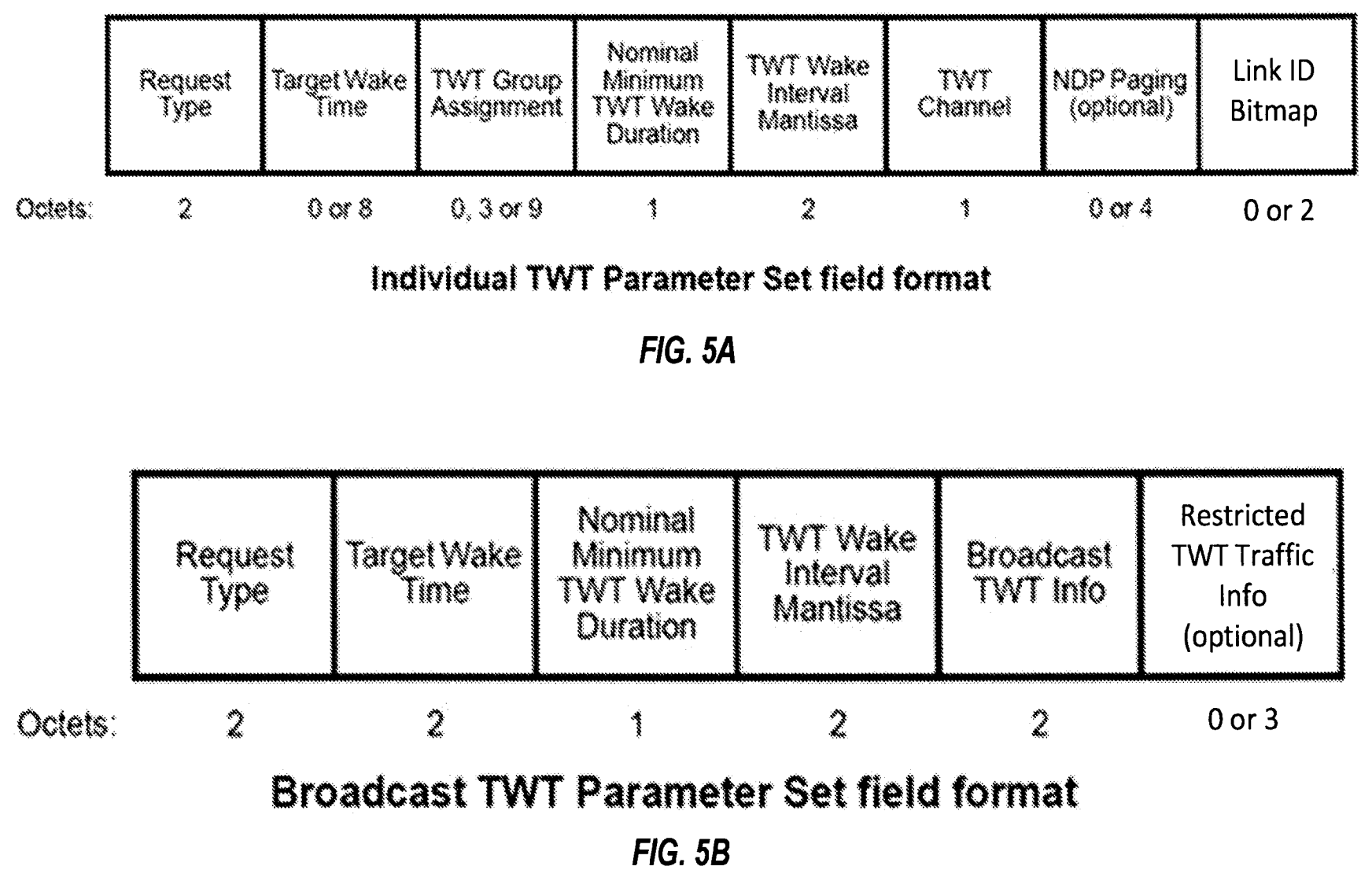

| | Request Type | Target Wake Time | TWT Group Assignment | Nominal Minimum TWT Wake Duration | TWT Wake Interval Mantissa | TWT Channel | NDP Paging (optional) | Link ID Bitmap |
|---|---|---|---|---|---|---|---|---|
| Octets: | 2 | 0 or 8 | 0, 3 or 9 | 1 | 2 | 1 | 0 or 4 | 0 or 2 |

Individual TWT Parameter Set field format

*FIG. 5A*

| | Request Type | Target Wake Time | Nominal Minimum TWT Wake Duration | TWT Wake Interval Mantissa | Broadcast TWT Info | Restricted TWT Traffic Info (optional) |
|---|---|---|---|---|---|---|
| Octets: | 2 | 2 | 1 | 2 | 2 | 0 or 3 |

Broadcast TWT Parameter Set field format

*FIG. 5B*

Extended TWT element format

Extended TWT Parameter (Set) field

Extended TWT Control field format

Extended TWT element format

Extended TWT Control field format *

Extended Individual/Broadcast/Restricted/off-channel TWT Parameter (Set) field

Extended TWT Control field format

Extended Individual/Broadcast/Restricted/off-channel TWT Parameter field

| Bit | Information | Notes |
|---|---|---|
| <Last assigned +1> | Extended TWT Support | Set to 1 to indicate support for reception and generation of a TWT element extensions |
| <Last assigned + 2> - *n* | Reserved | |

Extended Capabilities field

EHT MAC Capabilities field

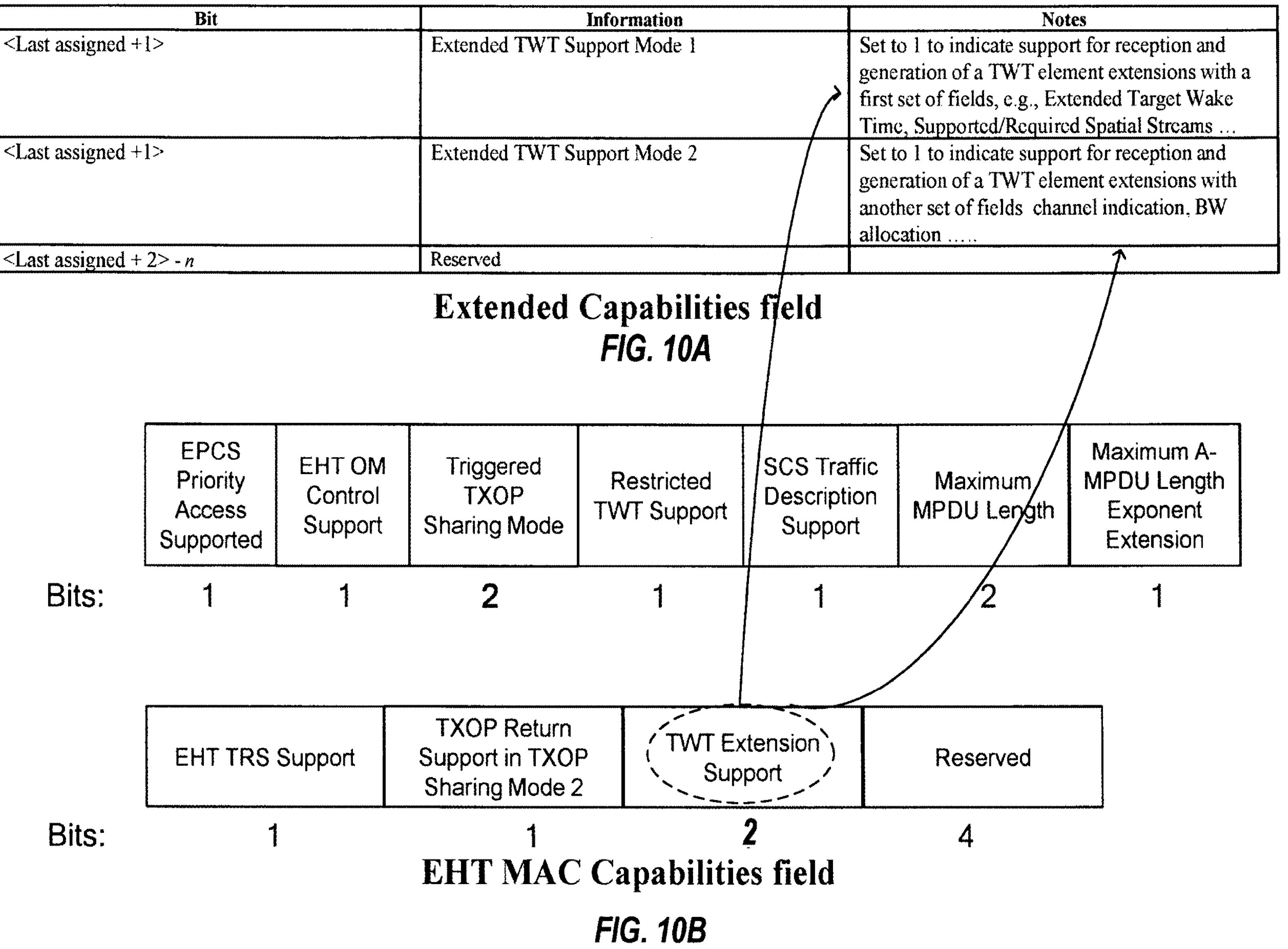

| Bit | Information | Notes |
| --- | --- | --- |
| <Last assigned +1> | Extended TWT Support Mode 1 | Set to 1 to indicate support for reception and generation of a TWT element extensions with a first set of fields, e.g., Extended Target Wake Time, Supported/Required Spatial Streams ... |
| <Last assigned +1> | Extended TWT Support Mode 2 | Set to 1 to indicate support for reception and generation of a TWT element extensions with another set of fields channel indication, BW allocation ..... |
| <Last assigned + 2> - *n* | Reserved | |

Extended Capabilities field

*FIG. 10A*

EHT MAC Capabilities field

*FIG. 10B*

Octets:
1102
Traffic Info Control
1
Restricted TWT DL TID Bitmap
1
Restricted TWT UL TID Bitmap
1
Restricted TWT Traffic Info field format 1102
B0
B1
B2
B7
1104
DL TID Bitmap Valid
UL TID Bitmap Valid
EXTENDED TWT INFORMATION
Bits:
1
1
6
Traffic Info Control field format

TARGET WAKEUP TIME ELEMENT EXTENSIONS

BACKGROUND

Field of the Disclosure

Aspects of the present disclosure relate to wireless communications, and more particularly, to techniques for target wakeup time (TWT) element extensions.

Description of Related Art

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (such as tens of meters to a few hundred meters).

SUMMARY

One aspect provides a method of wireless communication at a first station. The method includes transmitting a first element that indicates one or more target wakeup time (TWT) parameter sets; and transmitting a second element that provides information associated with at least one of the one or more TWT parameter sets indicated in the first element.

Another aspect provides a method of wireless communication at a second station. The method includes receiving a first element, from a first station, that indicates one or more TWT parameter sets; receiving a second element, from the first station, that provides information associated with at least one of the one or more TWT parameter sets indicated in the first element; and communicating in a TWT service period (SP) in accordance with the information provided in the second element.

Another aspect provides a method of wireless communication at a first station. The method includes transmitting a first element that indicates at least a first TWT parameter set wherein the first element includes information associated with an extension of the first TWT parameter set, the extension including different content than included in the first TWT parameter set; and communicating based at least in part on the first TWT parameter set and the extension.

Another aspect provides a method of wireless communication at a second station. The method includes receiving, from a first station, a first element that indicates at least a first TWT parameter set, wherein the first element includes information associated with an extension of the first TWT parameter set, the extension including different content than included in the first TWT parameter set; and communicating based at least in part on the first TWT parameter set and the extension.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 3 depicts a block diagram of an example multi-link device (MLD) deployment.

FIGS. 5A and 5B depict example formats of an individual TWT parameter set and broadcast TWT parameter set.

FIGS. 10A and 10B depict example formats for a capability indication.

DETAILED DESCRIPTION

Figure 1:
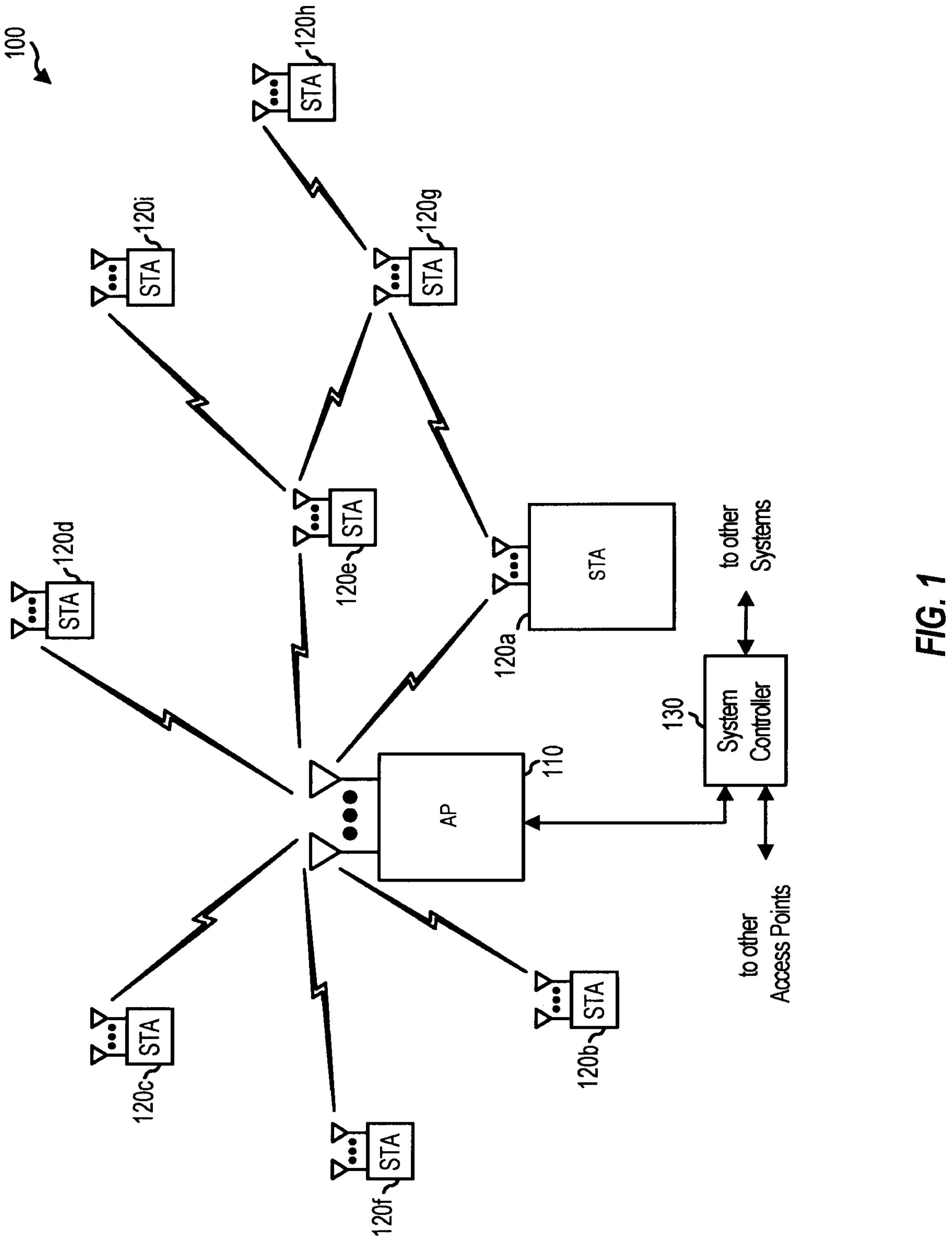
FIG. 1 depicts an example wireless communications network.

Aspects of the present disclosure provide apparatuses, methods, processing systems, and computer-readable mediums for TWT element extensions.

In wireless communications systems, a Target Wake Time (TWT) generally refers to a mechanism that may help reduce power consumption and improve resource efficiency by enabling wireless stations to stay in a low power state and wake at specified times (TWTs) in order to send or receive data. TWTs can help an AP coordinate access to a wireless medium by different stations (STAs), allowing high quality of service with reduced contention or overlap and increased device sleep time to reduce power consumption and extend battery life.

Parameters for TWT operation may be conveyed in a TWT information element (IE), which may be referred to simply as a TWT element, included within a frame. As used herein, the term Information Element or simply element generally refers to a unit of information transmitted as part of a management frame and provide a signaling mechanism for wireless devices, such as APs to communicate descriptive information (e.g., about themselves or a wireless network). One or more respective future TWTs may be indicated within a TWT IE. Conventional TWT IEs, however, are limited in the types of parameters they can convey and/or the values of those parameters. Further, conventional TWT IEs are running out of reserved fields to extend or carry additional information.

As a result, existing fields in TWT IE may be unable to support signaling of information that may be supported by newer amendments and newer technologies. For example, a channel field of TWT IE cannot signal greater than 160 MHz, while extremely high throughput (EHT) STAs may support 320 MHz. Support for larger bandwidths is expanding. Thus, development of new techniques and strategies for TWT signaling may be necessary.

Aspects of the present disclosure provide techniques for extending conventional TWT elements to convey information beyond what is supported by conventional TWT elements. For example, in some cases, a first station may transmit a first element that indicates one or more TWT parameter sets and transmit a second element that provides information associated with one or more of the TWT parameter sets indicated in the first element (e.g., additional information not conveyed in conventional TWT elements). In some cases, a first station may transmit a first element that indicates at least a first TWT parameter set wherein the first element includes information associated with an extension of the first TWT parameter set, the extension including different content than included in the first TWT parameter set and communicating based at least in part on the first TWT parameter set and the extension.

In some systems, an extended parameter set (or an Extended TWT element) may be carried in an "extended" version of an existing TWT frame.

Utilization one or more of the TWT element extension mechanisms disclosed herein may provide significant advantages. For example, the extension of TWT elements may enable support for signaling of larger bandwidths and additional information, expanding potential use cases of TWT, while preserving the advantages of reduced power consumption, increased reliability, and improved spectral efficiency (e.g., by enabling devices to determine how often to wake in order to send/receive data).

Introduction to Wireless Communications Networks

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.

Example Wireless Communications System

FIG. 1 is a diagram illustrating an example wireless communication system 100, in accordance with certain aspects of the present disclosure. System 100 may be a multiple-input multiple-output (MIMO)/multi-link operation (MLO) system 100. As shown in FIG. 1, an access point (AP) 110 includes an association manager 112 that may be configured to take one or more actions described herein. The wireless station (STA) 120*a* includes an association manager 122 that may be configured to take one or more actions described herein. In aspects, AP 110 and wireless station 120*a* may be MLDs as further described herein with respect to FIG. 3.

For simplicity, only one AP 110 is shown in FIG. 1. An AP is generally a fixed station that communicates with the wireless STAs and may also be referred to as a base station (BS) or some other terminology. A wireless STA may be fixed or mobile and may also be referred to as a mobile STA, a wireless device, or some other terminology. AP 110 may communicate with one or more wireless STAs 120 at any given moment on the downlink (DL) and/or uplink (UL). The DL (i.e., forward link) is the communication link from AP 110 to the wireless STAs 120, and the UL (i.e., reverse link) is the communication link from the wireless STAs 120 to AP 110. A wireless STA 120 may also communicate peer-to-peer with another wireless STA 120, for example, via a direct link such as a tunneled direct link setup (TDLS). A system controller 130 may be in communication with and provide coordination and control for the access points.

While portions of the following disclosure will describe wireless STAs 120 capable of communicating via Spatial Division Multiple Access (SDMA), for certain aspects, the wireless STAs 120 may also include some wireless STAs 120 that do not support SDMA. Thus, for such aspects, an AP 110 may be configured to communicate with both SDMA and non-SDMA wireless STAs 120. This approach may conveniently allow older versions of wireless STAs 120 ("legacy" stations) to remain deployed in an enterprise, extending their useful lifetime, while allowing newer SDMA wireless STAs 120 to be introduced as deemed appropriate.

System 100 employs multiple transmit and multiple receive antennas for data transmission on the DL and UL. AP 110 is equipped with $N_{ap}$ antennas and represents the multiple-input (MI) for DL transmissions and the multiple-output (MO) for UL transmissions. A set of K selected wireless stations 120 collectively represents the multiple-output for DL transmissions and the multiple-input for UL transmissions. For pure SDMA, it is desired to have $N_{ap} \geq K \geq 1$ if the data symbol streams for the K wireless STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected wireless STA transmits user-specific data to and/or receives user-specific data from the access point. In general, each selected wireless STA may be equipped with one or multiple antennas (i.e., $N_{sta} \geq 1$). The K selected wireless STAs can have the same or different number of antennas.

System 100 may be a time division duplex (TDD) system or a frequency division duplex (FDD) system. For a TDD system, the DL and UL share the same frequency band. For an FDD system, the DL and UL use different frequency bands. System 100 may also utilize a single carrier or multiple carriers for transmission. Each wireless STA may be equipped with a single antenna or multiple antennas. System 100 may also be a TDMA system if wireless STAs 120 share the same frequency channel by dividing transmission/reception into different time slots, each time slot being assigned to a different wireless STA 120.

Figure 2:
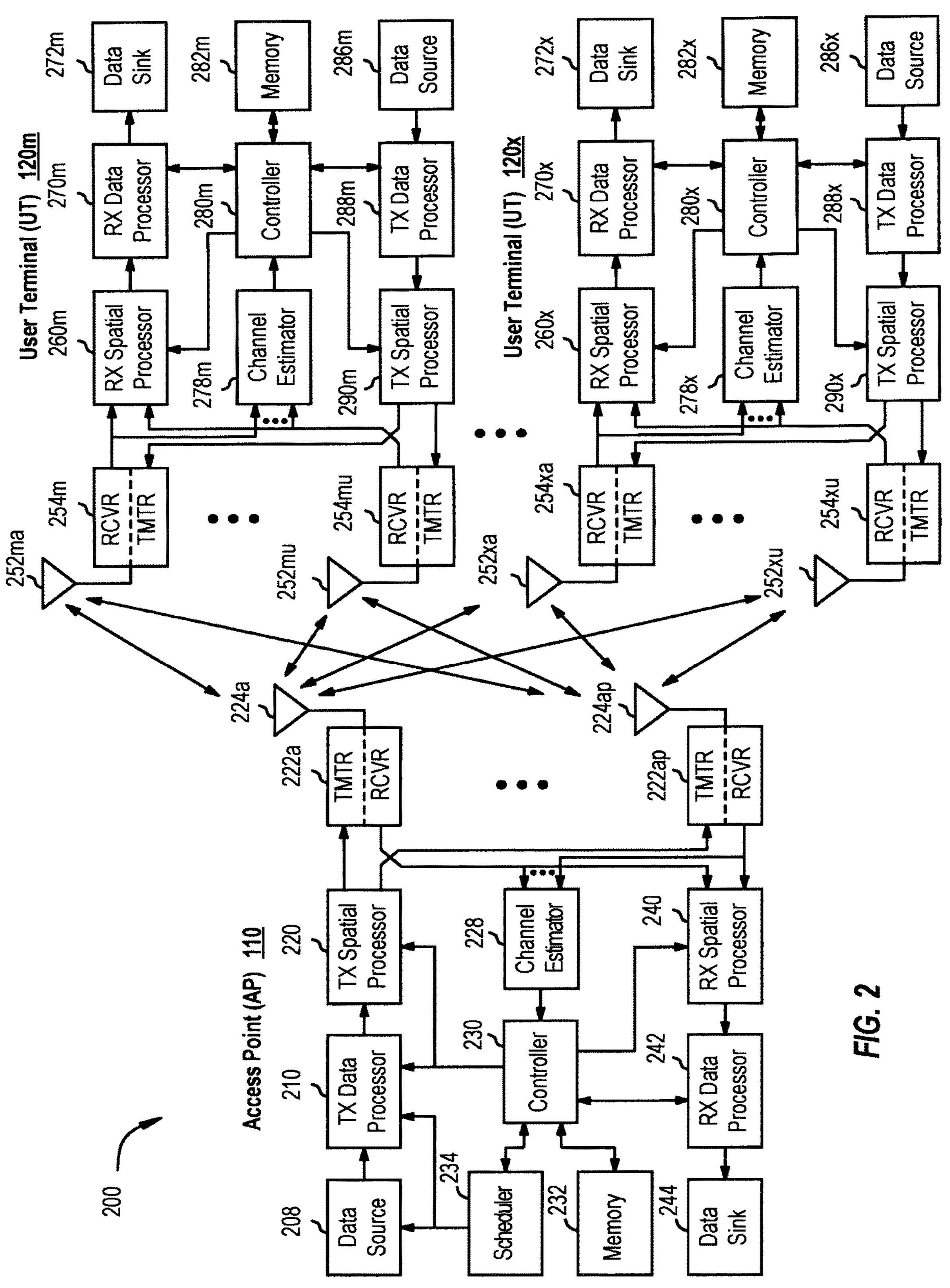
FIG. 2 depicts an example disaggregated base station architecture.

FIG. 2 illustrates a block diagram of AP 110 and two wireless STAs 120*m* and 120*x* in a MIIVIO/MLO system, such as system 100, in accordance with certain aspects of the present disclosure. In certain aspects, AP 110 and/or wireless STAs 120*m* and 120*x* may perform various techniques to ensure that a non-AP MLD is able to receive a group addressed frame. For example, AP 110 and/or wireless STAs 120*m* and 120*x* may include a respective association manager as described herein with respect to FIG. 1.

AP 110 is equipped with $N_{ap}$ antennas 224*a* through 224*t*. Wireless STA 120*m* is equipped with $N_{sta,m}$ antennas 252*ma* through 252*mu*, and wireless STA 120*x* is equipped with $N_{sta,x}$ antennas 252*xa* through 252*xu*. AP 110 is a transmitting entity for the DL and a receiving entity for the UL. Each wireless STA 120 is a transmitting entity for the UL and a receiving entity for the DL. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, $N_{UL}$ wireless STAs are selected for simultaneous transmission on the uplink, $N_{DL}$ wireless STAs are selected for simultaneous transmission on the downlink, $N_{UL}$ may or may not be equal to $N_{DL}$, and $N_{UL}$ and $N_{DL}$ may be static values or can change for each scheduling interval. The beam-steering or some other spatial processing technique may be used at the access point and wireless station.

On the UL, at each wireless STA 120 selected for UL transmission, a transmit (TX) data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless STA and provides a data symbol stream. A TX spatial processor 290 performs spatial processing on the data symbol stream and provides $N_{sta,m}$ transmit symbol streams for the $N_{sta,m}$ antennas. Each transceiver (TMTR) 254 receives and processes (e.g., converts to analog, amplifies, filters, and frequency upconverts) a respective transmit symbol stream to generate an uplink signal. $N_{sta,m}$ transceivers 254 provide $N_{sta,m}$ UL signals for transmission from $N_{sta,m}$ antennas 252 to AP 110.

$N_{UL}$ wireless STAs may be scheduled for simultaneous transmission on the uplink. Each of these wireless STAs performs spatial processing on its data symbol stream and transmits its set of transmit symbol streams on the UL to the AP 110.

At AP 110, $N_{ap}$ antennas 224*a* through 224*ap* receive the UL signals from all NUI, wireless STAs transmitting on the UL. Each antenna 224 provides a received signal to a respective transceiver (RCVR) 222. Each transceiver 222 performs processing complementary to that performed by transceiver 254 and provides a received symbol stream. A receive (RX) spatial processor 240 performs receiver spatial processing on the $N_{ap}$ received symbol streams from $N_{ap}$ transceiver 222 and provides $N_{UL}$ recovered UL data symbol streams. The receiver spatial processing is performed in accordance with the channel correlation matrix inversion (CCMI), minimum mean square error (MMSE), soft interference cancellation (SIC), or some other technique. Each recovered UL data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless STA may be provided to a data sink 244 for storage and/or a controller 230 for further processing.

On the DL, at AP 110, a TX data processor 210 receives traffic data from a data source 208 for $N_{DL}$ wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides $N_{DL}$ DL data symbol streams for the $N_{DL}$ wireless stations. A TX spatial processor 220 performs spatial processing (such as a precoding or beamforming, as described in the present disclosure) on the $N_{DL}$ DL data symbol streams, and provides $N_{ap}$ transmit symbol streams for the $N_{ap}$ antennas. Each transceiver 222 receives and processes a respective transmit symbol stream to generate a DL signal. $N_{ap}$ transceivers 222 providing $N_{ap}$ DL signals for transmission from $N_{ap}$ antennas 224 to the wireless STAs.

At each wireless STA 120, $N_{sta,m}$ antennas 252 receive the $N_{ap}$ DL signals from access point 110. Each transceiver 254 processes a received signal from an associated antenna 252 and provides a received symbol stream. An RX spatial processor 260 performs receiver spatial processing on $N_{sta,m}$ received symbol streams from $N_{sta,m}$ transceiver 254 and provides a recovered DL data symbol stream for the wireless station. The receiver spatial processing is performed in accordance with the CCMI, MMSE or some other technique. An RX data processor 270 processes (e.g., demodulates, deinterleaves and decodes) the recovered DL data symbol stream to obtain decoded data for the wireless station.

At each wireless STA 120, a channel estimator 278 estimates the DL channel response and provides DL channel estimates, which may include channel gain estimates, SNR estimates, noise variance and so on. Similarly, a channel estimator 228 estimates the UL channel response and provides UL channel estimates. Controller 280 for each wireless STA typically derives the spatial filter matrix for the wireless station based on the downlink channel response matrix $H_{dn,m}$ for that wireless station. Controller 230 derives the spatial filter matrix for the AP based on the effective UL channel response matrix $H_{up,eff}$. Controller 280 for each wireless STA may send feedback information (e.g., the downlink and/or uplink eigenvectors, eigenvalues, SNR estimates, and so on) to the AP. Controllers 230 and 280 also control the operation of various processing units at AP 110 and wireless STA 120, respectively.

Overview of Multi-Link Devices

As initially described above, a multi-link device (MLD) generally refers to a single device or equipment that includes two or more station (STA) instances or entities, implemented in a physical (PHY)/medium access control (MAC) layer and configured to communicate on separate wireless links. In some examples, each MLD may include a single higher layer entity, such as a MAC Service Access Point (SAP) that may assign MAC protocol data units (MPDUs) for transmission by the separate STA instances.

FIG. 3 shows a block diagram of an example MLD deployment. As shown in FIG. 3, an access point (AP) MLD may communicate with a non-AP MLD. Each of the AP MLD and non-AP MLD may include at least two STA entities (hereinafter also referred to simply as "STAs") that may communicate with associated STAs of another MLD. In an AP MLD, the STAs may be AP STAs (STAs serving as APs or simply "APs"). In a non-AP MLD, the STAs may be non-AP STAs (STAs not serving as APs). As also described above, MLDs may utilize multi-link aggregation (MLA) (which includes packet level aggregation), whereby MPDUs from a same traffic ID (TID) may be sent via two or more wireless links.

Various modes of communication may be employed in MLD implementations. For example, a MLD may communicate in an Asynchronous (Async) mode or a Synchronous (Sync) mode.

In the Async mode, a STA/AP may count down (for example, via a random backoff (RBO)) on both wireless links. A physical layer convergence protocol (PLCP) protocol data units (PPDU) start/end may happen independently on each of the wireless links. As a result, Async mode may potentially provide latency and aggregation gains. In certain cases, relatively complex (and costly) filters may be needed (for example, in the case of 5 GHz+6 GHz aggregation).

In the Sync mode, a STA/AP may also count down on both wireless links (e.g., assuming Link 1 and Link 2). If a first link (e.g., Link 1) wins the medium, both links may transmit PPDUs at the same time. Accordingly, this mode may need some restrictions to minimize in-device interference.

The Sync mode may work in 5 GHz+6 GHz aggregation and may require relatively low-filter performance, while still providing latency and aggregation gains. However, due to that STA's tiled architecture, this latency and aggregation gains may be hard to achieve.

Although not shown, a third mode of communication may include a Basic (for example, multi-primary with single link transmission) mode. In the Basic mode, a STA/AP may also count down on both wireless links. However, transmission may only occur on the wireless link that wins the medium. The other wireless link may be blocked by in-device interference greater than −62 decibels per milliwatt (dBm). No aggregation gains may be realized in this mode.

Overview of TWT Service Periods (SPs)

As noted above, a Target Wake Time (TWT) generally refers to a mechanism that may help reduce power consumption and improve resource efficiency by enabling wireless stations to stay in a low power state and wake at specified times (TWTs) in order to send or receive data. TWTs can help an AP coordinate access to a wireless medium by different stations (STAs), allowing high quality of service with reduced contention or overlap and increased device sleep time to reduce power consumption and extend battery life. Thus, the TWT mechanism may help minimize contention between clients and reduce the amount of time a client in power save mode to be awake.

Figure 4:
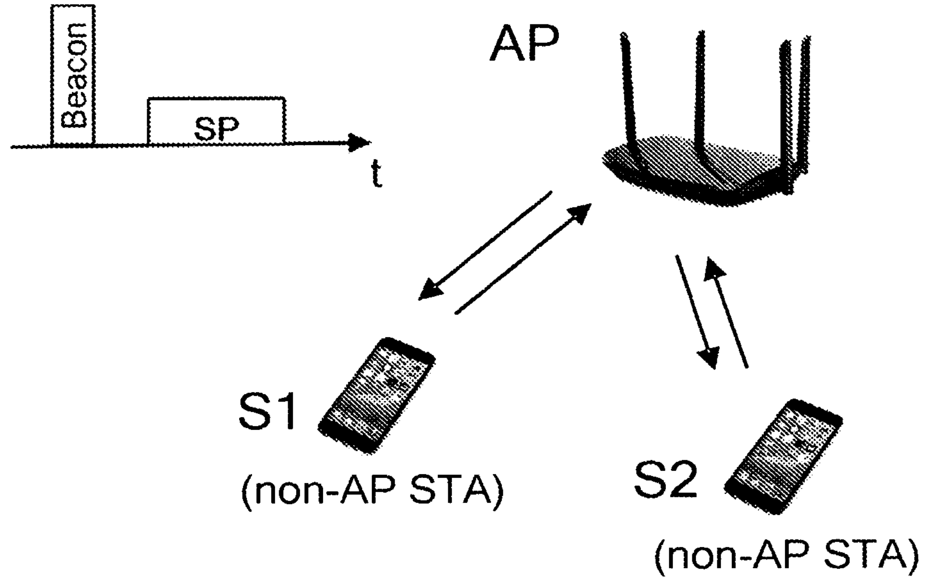
FIG. 4 depicts example communications between an access point (AP) and wireless stations (STAs).

TWT mechanisms may be understood with reference to the example scenario shown in FIG. 4, in which an access point (AP) communicates with stations (STAs) S1 and S2. The example assumes that the AP (e.g., an 802.11 be AP) and stations S1 and S2 support TWTs. As illustrated in FIG. 3, the AP may transmit a beacon indicating a TWT service period (SP).

For an individual TWT case, a STA may be assigned specific times to wake up and exchange frames. The schedule may determined and delivered by the AP. A STA may not need to know about TWT values assigned to other STAs. In some cases, if a STA wants to establish a TWT agreement, the STA may communicate its waking schedule information to the AP. The AP may then determine a schedule and deliver TWT values to the STA (e.g., considering schedules of other STAs). The STA may wake up and transmit a frame according to the schedule. In an explicit mode, the AP may transmit the STA information regarding a next TWT. The STA may wake up again at this next scheduled time to send a frame and receive a new TWT information. In an implicit mode, the STA may calculate the next TWT time by adding a fixed value to the current TWT value.

In some cases, a STA may operate according to TWT parameters indicated by the AP (e.g., in a beacon). In other cases, a STA may negotiate a TWT with desired parameters. If a schedule is agreed upon, the AP may respond with an "Accept TWT" indication.

For broadcast TWTs, the AP transmits TWT parameters in a beacon frame, as illustrated in FIG. 4, using the TWT Element. The TWT Element might also be sent in other management frames, such as a probe response frame. STAs may use TWT parameters from a most recently received TWT element carried in the Management frames of its associated AP. APs may provide a TWT schedule to all the clients that supports broadcast TWT. In some cases, the AP may send a trigger frame to discover which STAs are awake. The AP will then send frames to these STAs, allowing them to reenter a low power state. STAs may decide to join or leave a broadcast TWT group.

A TWT element may include one or more TWT parameter sets. The particular content of a TWT parameter set may depend on whether the parameter set is for an individual TWT or a broadcast TWT. For example, FIG. 5A illustrates an example format of an individual TWT parameter set, while FIG. 5B illustrates an example format of a broadcast TWT parameter set.

As shown in FIGS. 5A, the individual TWT parameter set may include a request type field, which may specify a type of message (e.g., request, suggest, demand, or accept). The individual TWT parameter set may also include a Target Wake Time field, which may indicate a next time in microseconds at which a station participating in the TWT-based communication should wake up for the TWT session. The individual TWT parameter set may also include a TWT Group Assignment field, which may indicate the TWT Group of the requesting STA and an assigned TWT value. The TWT Group Assignment field provides information to a requesting STA about the TWT group to which the STA is assigned. This field contains TWT Group ID, Zero Offset of Group (optional), TWT Unit, and TWT Offset subfields. The individual TWT parameter set may also include a Nominal Minimum TWT wake duration, which may indicate a minimum time duration a station shall stay awake since the starting time of the TWT session in order to be able to receive frames from the other station(s). The individual TWT parameter set may also include a TWT Wake Interval Mantissa, which may indicate a time interval between subsequent TWT sessions for the station. The value of the TWT Wake interval may be higher than 0 when the TWT is periodic. The individual TWT parameter set may also include a TWT Channel field, which may indicate a channel a station can use temporarily as a primary channel.

The individual TWT parameter set may also include a null data packet (NDP) Paging field, indicating that NDP paging frames are to be used. When setting up a TWT, a station can request the AP to use NDP Paging frames. In this case, the AP sends NDP Paging frames at the beginning of TWT SP if it has buffered frames destined for the TWT station. If no NDP Paging frames are received, the station can switch to the doze state after a Minimal Awake Duration. NDP Paging frames may also be sent to inform the station about critical changes in beacon. NDP Paging significantly reduces power consumption.

Aspects Related to TWT Element Extensions

As described above, parameters for TWT operation may be conveyed in a TWT element that may carry one or more TWT parameter sets, such as those shown in FIGS. 5A and 5B. Conventional TWT IEs that indicate such parameter sets as shown in FIGS. 5A and 5B, however, are limited in the types of parameters they can convey and/or the values of those parameters. Further, conventional TWT IEs are running out of reserved fields to extend or carry additional information.

As a result, existing fields in TWT IE may be unable to support signaling of information that may be supported by newer amendments and newer technologies. For example, a channel field of TWT IE cannot signal greater than 160 MHz, while extremely high throughput (EHT) STAs may support 320 MHz. Support for larger bandwidths is expanding. Thus, development of new techniques and strategies for TWT signaling may be necessary. Future enhancements may also expand support for larger BWs. In addition, 60 GHz can have operational bandwidth (BW) of up to 1.2 GHz. Some features are currently not signaled (in existing TWT IEs), but may be of interest in future use cases, such as the ability to signal splitting of spatial stream between different participants within the SP or signaling additional parameters for restricted TWT (r-TWT).

Aspects of the present disclosure provide techniques for extending conventional TWT elements to convey information beyond what is supported by conventional TWT elements. Aspects of the present disclosure also provide mechanisms for indicating support for the new TWT IE/fields. In other words, since the contents of the new fields may apply along-side fields carried in current TWT IEs, current (legacy) STAs may not be able to support it. In addition, some implementations may choose to not support one or more of the new fields (and may, therefore, not indicate their support even if they are capability). As will be described in greater detail below, aspects of the present disclosure provide various mechanisms to indicate capability for extended TWT support so that both parties (STAs and APs) can have a clear expectation of whether the other can process the new fields.

There are various options for providing extended TWT information. For example, according to a first option, an additional (e.g., newly defined) TWT element may be used, in addition to an existing TWT element. According to a second option, an existing element may be extended (e.g., to carry additional extended TWT information). For example, an existing TWT element (or some other element, such as a TWT Constraint Parameters element) may be extended to carry additional extended TWT information.

For the first option, a first station (e.g., an AP) may transmit a first element (e.g., a first TWT element) that indicates one or more target wakeup time (TWT) parameter sets. The first station may also transmit a second element that provides information associated with one or more of the TWT parameter sets indicated in the first element. The second element, for example, may be transmitted after the first element and the information conveyed therein may represent an extension to a parameter set included in the first element. For example, the information in the second element may indicate at least one of: signal bandwidth greater than a maximum signal bandwidth that can be indicated in the first element, bandwidth allocated to one or more different stations, a spatial multiplexing mode, a number of spatial streams; or one or more links to which the information applies to.

According to this option, a new element (e.g., which may be defined as an Extended TWT element) may be negotiated between the two multilink devices (MLDs), or two STAs. The element may be conveyed in broadcast or unicast frames to provide additional parameters related to one or more TWT parameter sets that are carried in the (existing) TWT element.

Figures 6A, 6B, 6C:
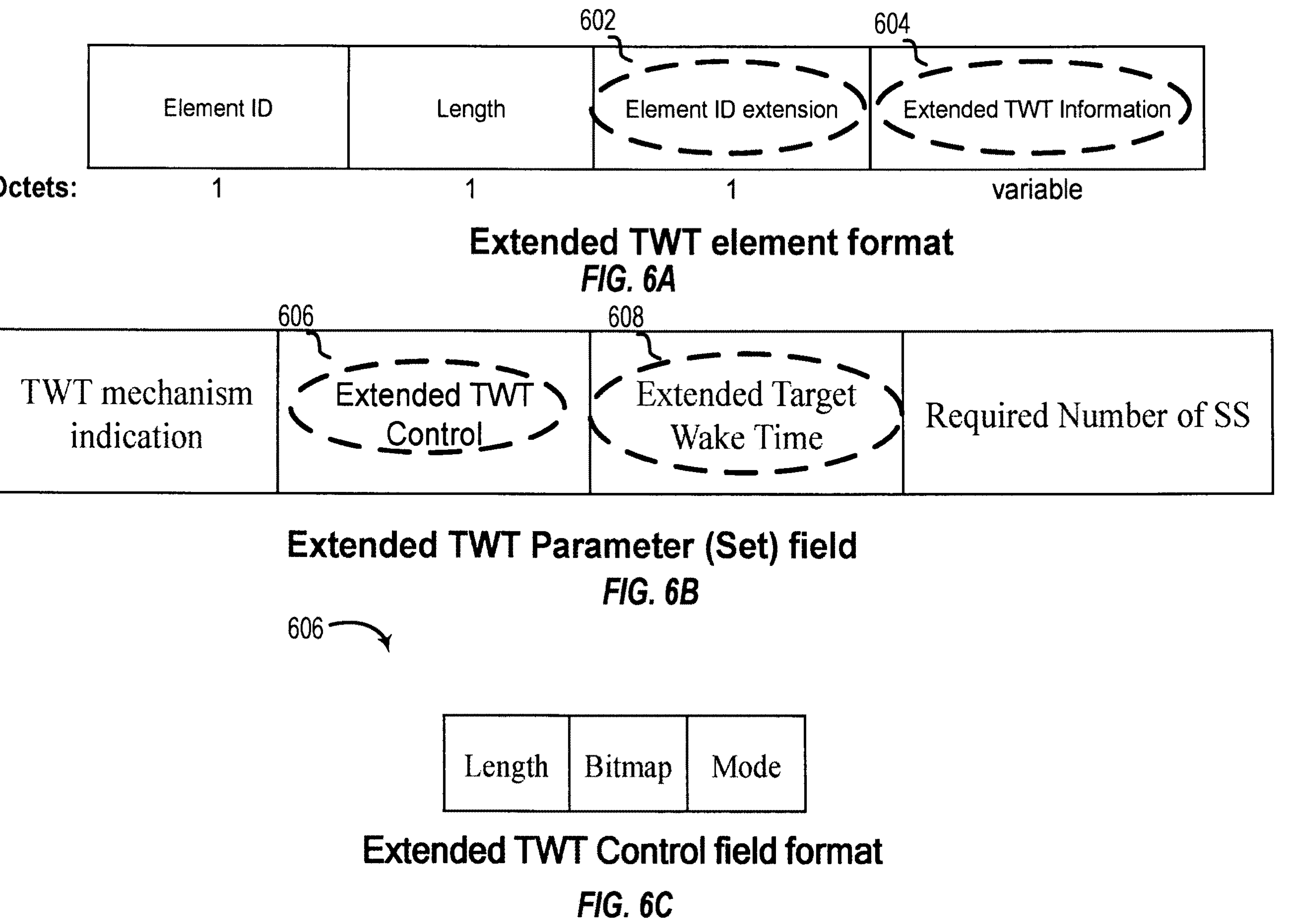
FIGS. 6A, 6B, and 6C depict example formats for an extended TWT element.

FIG. 6A depicts one example format for an extended TWT element. As illustrated, the element may include an element ID extension 602 and an extended TWT information field 604 that may include extended information or indicate the presence of an extended TWT control field 606 or extended TWT field 608, which may be variable in length. As illustrated in FIG. 6B, an extended TWT parameter field set may include an extended TWT control field 606 and an extended TWT field 608. As illustrated in FIG. 6C, the extended TWT control field 606 may include length, bitmap, and mode fields. The length field may be used to determine the length of subsequent fields in the Extended TWT Parameter field/set (which may help maintain backward compatibility while allowing future extension of this element). The bitmap may determine which fields are indicated and which are reserved (zero). The mode field may also signal which mode is used for a particular TWT protocol.

Figures 7A, 7B, 7C:
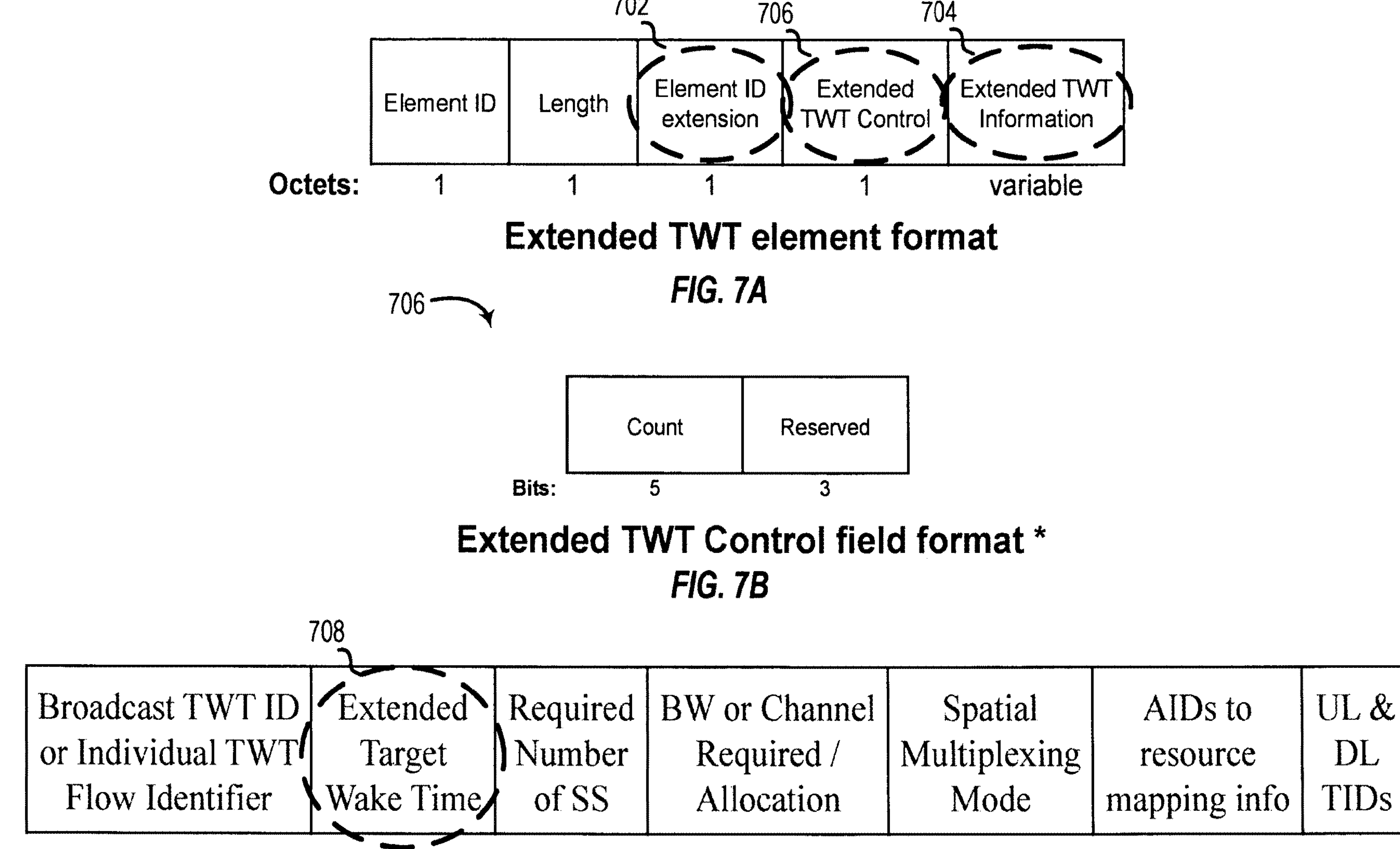
FIGS. 7A, 7B, and 7C depict example formats for an extended TWT element.

FIG. 7A depicts another example format for an extended TWT element. As illustrated, the element may include a length field, an element ID extension 702, extended TWT control field 706, and extended TWT information field 704, which may be variable in length. The length field may be added to enable signaling of different sets of parameters. As illustrated in FIG. 7B, an extended TWT control field may include a count field (e.g., to indicate a number (or length of) subsequent extended TWT information fields and reserved bits. The reserved bits may be used to indicate extensions to different types of TWT (e.g., Individual/broadcast . . . ) and possibly different modes of extensions for each TWT mechanism. FIG. 7C illustrates an example extended TWT parameter set field, which may include an extended TWT time field 708.

Figures 8A, 8B, 8C:
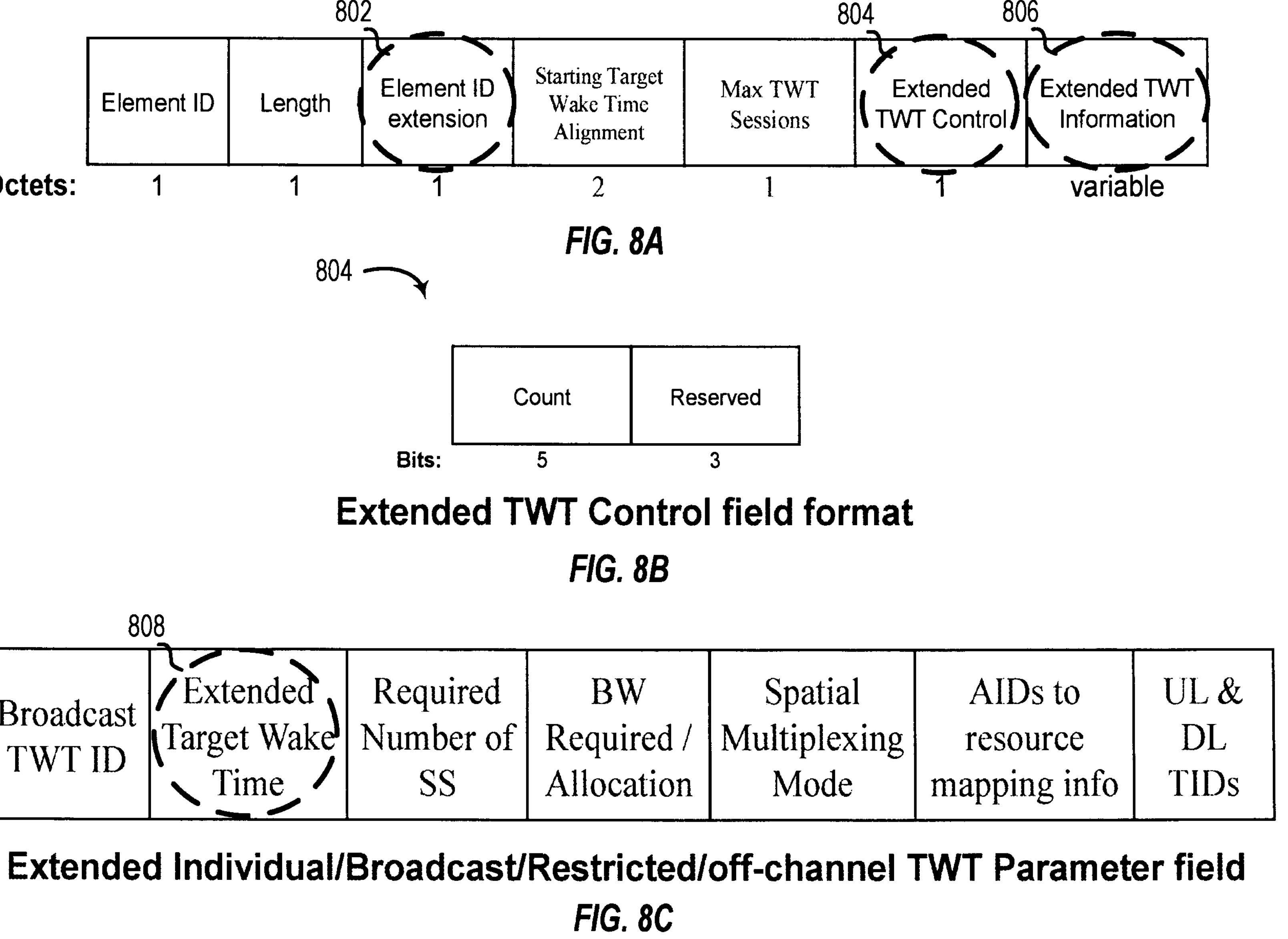
FIGS. 8A, 8B, and 8C depict example formats for an extended TWT element.

As illustrated in FIG. 8A, according to the second option, an existing TWT element may be extended (e.g., to carry additional extended TWT information). As illustrated, the TWT element may include an element ID extension field 802, Extended TWT control field 804, and extended TWT information field 806. As illustrated in FIG. 8B, the extended TWT control field may include a count field (e.g., to indicate a number (or length of) subsequent extended TWT information fields and reserved bits. The reserved bits may be used to indicate extensions to different types of TWT (e.g., Individual/broadcast . . . ) and possibly different modes of extensions for each TWT mechanism. FIG. 8C illustrates an example extended TWT parameter set field, which may include an extended TWT time field 808. In some cases, an extended TWT element may include a format/fields similar to that shown in FIGS. 6A-6C. For example, in that case, an extended TWT control field format may include a length, bitmap, and mode field with similar functionality to that shown in FIG. 6C.

In some systems, an extended parameter set (or Extended TWT element) may be carried in an "extended" version of an existing TWT frame. For example, if either peer (AP or client) wants to change one or more parameters that belong to the extended parameter set(s), then the peer can send the updated extended parameter set(s) in a (new) Extended TWT Information frame. Depending on the scenario, an AP may transmit such an "extended" frame to an individual client (individually addressed) or can send it to a group of clients (i.e., transmitted to group address).

Regardless of the signaling option (additional TWT element or extension of an existing TWT element), various types of functionality may be enabled by such extension. For example, one example functionality that may be signaled by this element is to allow a finer time granularity for a TWT schedule. For example, current finest granularity of periodicity that a TWT (r-TWT) can support may be one TU (e.g., 1024p), which may result in a mismatch between the certain (e.g., XR) burst arrival and the r-TWT SP. This mismatch may grow to up to several milliseconds with subsequent TWT SPs, which may hurt the latency performance of latency-sensitive traffic. An extended TWT functionality may help synchronize the latency-sensitive traffic burst arrival time with the r-TWT SPs at a sub-1024 μs level (e.g., up to 0 μs). In some cases, the granularity may be indicated to a station (e.g., in an extended TWT element-or extension of an existing TWT element), providing additional flexibility in adapting TWT-SP start times to expected traffic arrival times below 1 TU which can help latency sensitive traffic and time sensitive networking (TSN) applications.

Another functionality that may be signaled via extended TWT is a bandwidth greater than 160 MHz or bandwidth allocated to different STAs (each STA being allocated a subchannel during the TWT). While existing TWT element can signal only up to 160 MHz while EHT STA can (optionally) support 320 MHz, an extension may support much greater bandwidth.

Another functionality that may be signaled via extended TWT may allow the exchange of spatial multiplexing mode in which a device can share the same TWT service period (SP) with more than peer device. In such a scheme, the device can share different spatial streams with different peers. Further functionality may be to indicate a minimum number of spatial streams support for particular TWT SP.

The support of this extended TWT element and the operations related to it can be indicated by one or more bits. This indication can be carried in either the Extended Capabilities element or HE capabilities element or EHT capabilities element or (existing) TWT element or some other (new) element.

Figures 9A, 9B:
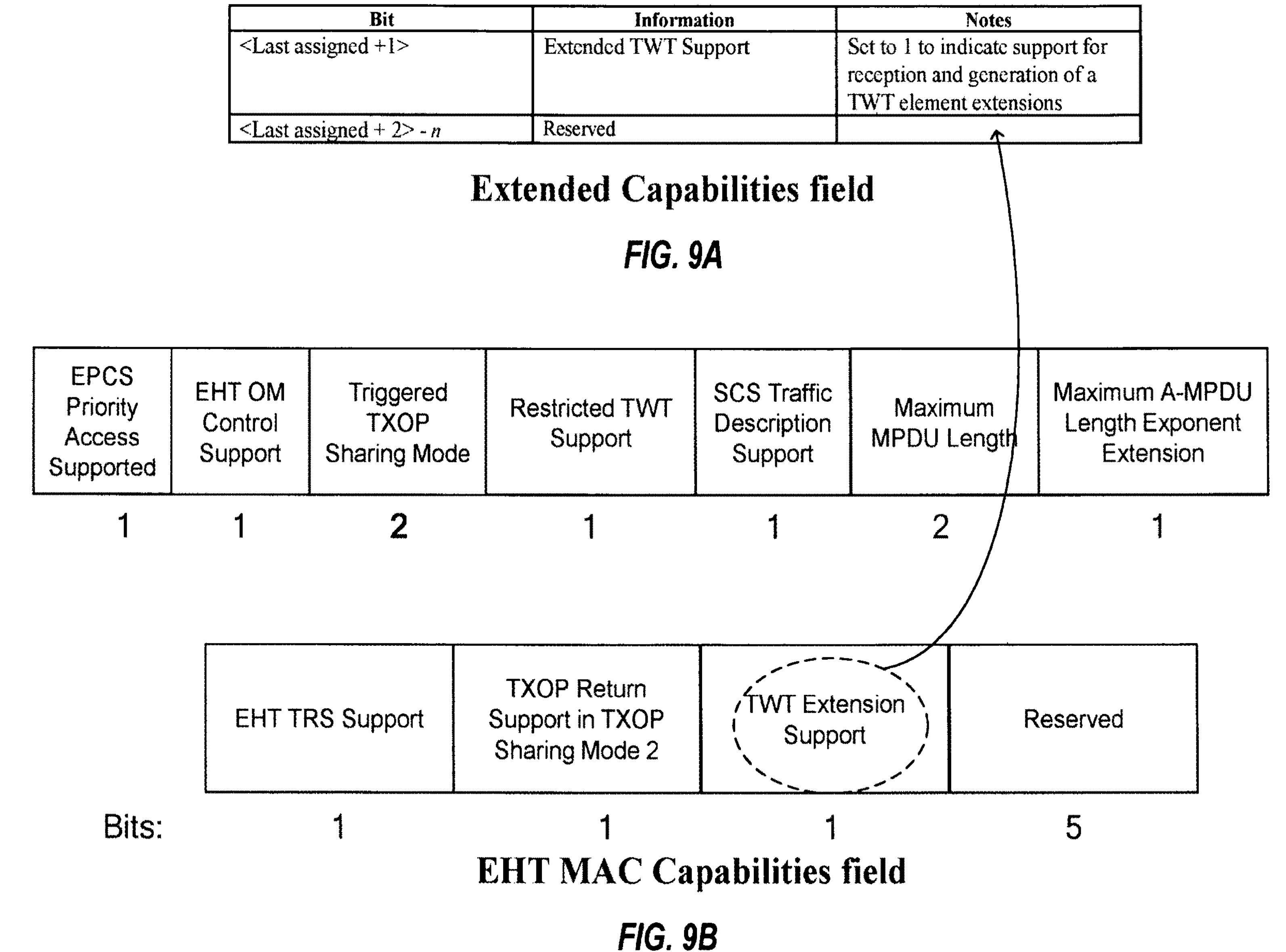
FIGS. 9A and 9B depict example formats for a capability indication.

As illustrated in FIGS. 9A and 9B, a single TWT extension support bit in an EHT capabilities field may be set to indicate support for reception and generation of TWT element extensions. As illustrated in FIGS. 10A and 10B, in some cases, multiple TWT extension support bits in an EHT capabilities field may be used to indicate support for reception and generation of TWT element extensions. For example, each bit may be set to 1 to indicate support for reception and generation of a TWT element extensions with a different set of fields (e.g., Extended Target Wake Time, Supported/Required Spatial Streams, etc.). While the example shows 2 bits, any number of bits may be used to indicate support for a different number of parameter sets.

If a receiving STA supports extended TWT, then it will apply the additional information (i.e., parameters) provided in the new extended TWT element in conjunction with the parameters provided in TWT element. In some cases, the extended parameters may override the ones in the legacy TWT IE. For example, all legacy STAs conform to the parameters signaled in the (existing) TWT IE signaled in Beacon frame while new clients conform to the parameters in the Extended TWT IE (carried in the beacon) while sharing the same TWT SPs with legacy STAs.

Figures 11A, 11B:
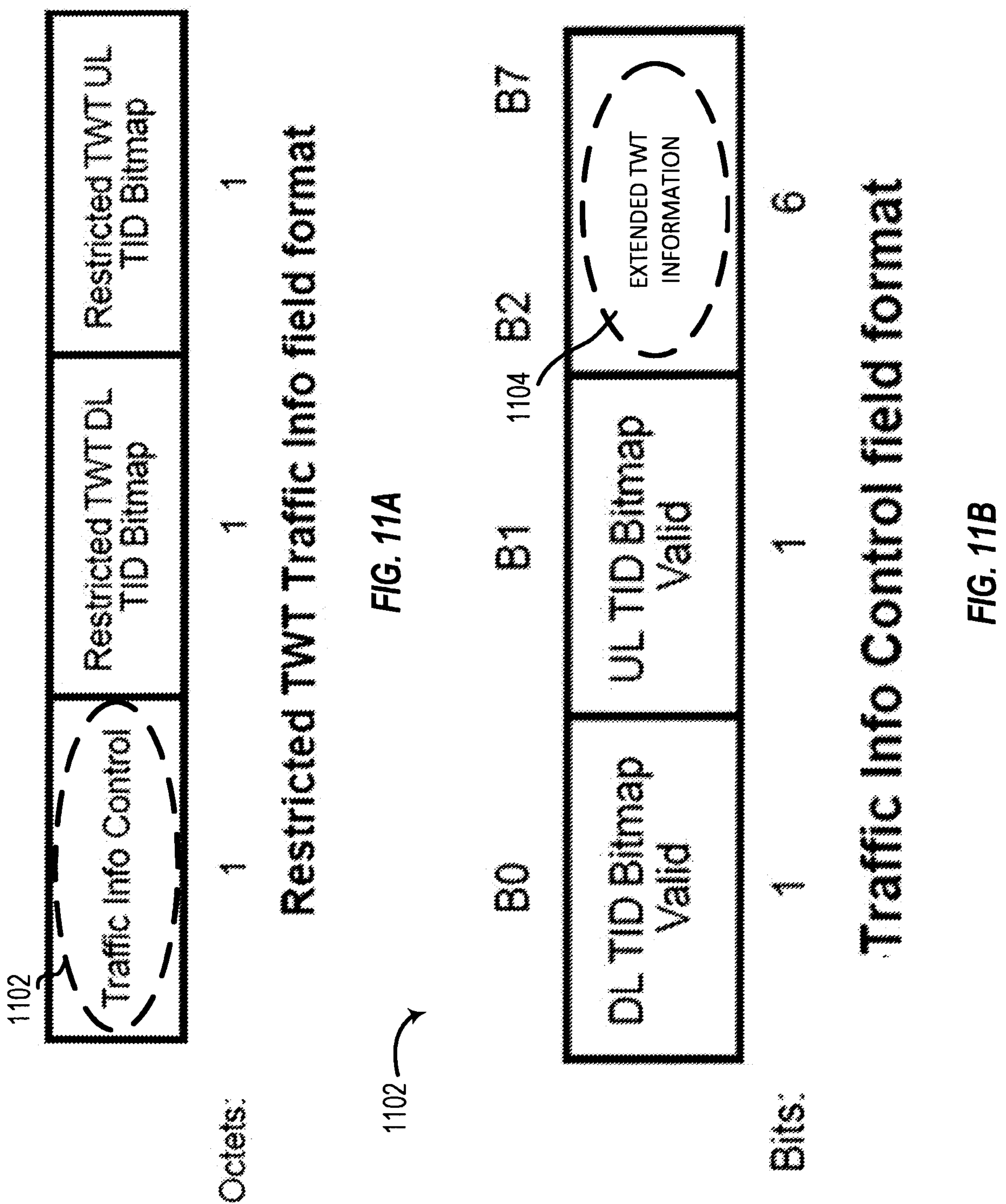
FIGS. 11A and 11B depict example formats of a restricted TWT (r-TWT) traffic information field and a traffic information control field.

In some cases, the additional information (associated with a first TWT parameter set) may always be included in transmitted frames that carry the TWT element. In other cases, a subfield in the first TWT parameter set may indicate the presence of the additional information (e.g., an extended parameter set). The indication of the presence of the additional information in the first parameter set may be signaled through a reserved or existing subfield in the TWT element. For example, the presence of the additional information may be indicated using a subfield in the Control field or the Broadcast TWT Parameter Set field. In some cases the presence of the additional information may be carried in the Broadcast TWT Info subfield. For example, as shown in FIGS. 11A and 11B, a Restricted TWT Traffic Info subfield may be used to indicate extended TWT parameters. For example, one or more (currently reserved) bits 1104 of a Traffic Information Control subfield 1102 may be used to signal extended TWT information. This mechanism may be used, for example, to expand an existing R-TWT parameter set (e.g., in the case of TWT setup only). In some cases, a reserved bit in the Traffic Info Control field may indicate the presence of (possibly via a bitmap) corresponding to additional parameters for an R-TWT parameter set. In some cases, the additional parameters may be carried in the Broadcast TWT Parameter Set field.

Figure 12:
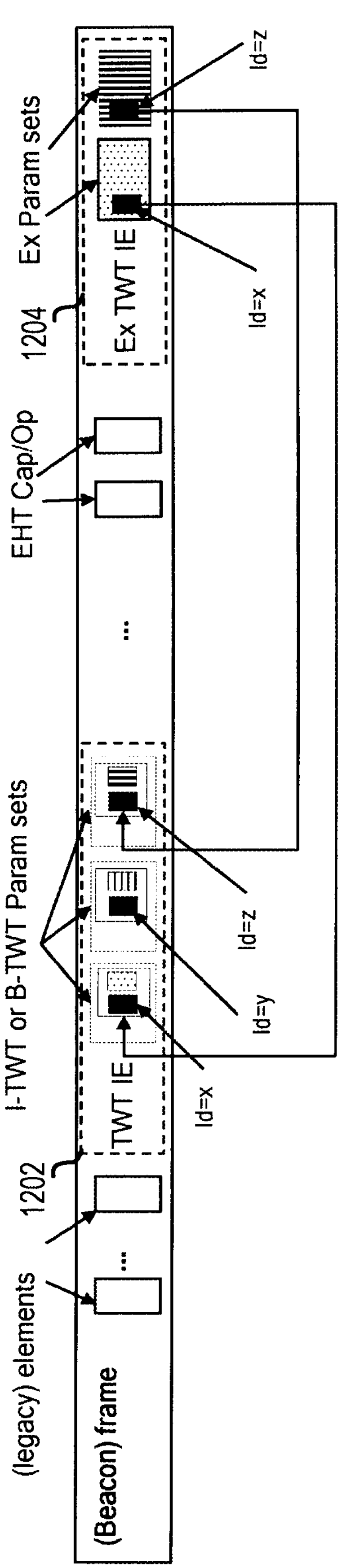
FIG. 12 depicts a diagram illustrating example links between TWT information elements (IEs) and extended TWT IEs.

In general, the extended TWT elements proposed herein may carry parameter sets that belong to any TWT mechanism (e.g., Individual TWT, Broadcast/Restricted TWT, Off-channel TWT). As illustrated in FIG. 12, it may be possible that a TWT element carries a parameter set for more than one TWT SP. In such case, each SP may be identified by a TWT ID (e.g., ID=x and ID=y in the illustrated example). The same ID may be used in the extended TWT element 1204 (and conventional TWT element 1202) to identify the TWT SPs for which the additional parameter apply.

In some cases, a device that supports extended TWT element may not include the extended TWT element in an individually addressed TWT setup frame if the peer has not indicated support for it. A device that supports the extended TWT element may include the extended TWT element in a broadcast frame (such as a beacon frame or broadcast probe response frame).

Example Operations of Stations

Figure 13:
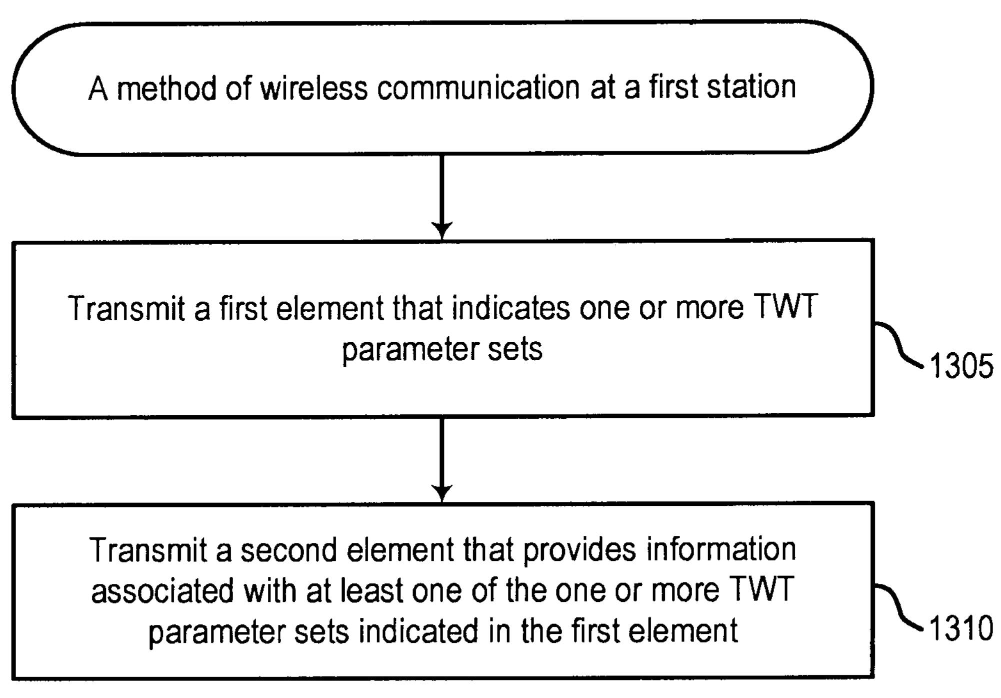
FIG. 13 depicts a method for wireless communications.

FIG. 13 shows an example of a method 1300 of wireless communication at a first station. In some examples, first station is an AP 110 of FIGS. 1 and 2.

Method 1300 begins at step 1305 with transmitting a first element that indicates one or more TWT parameter sets. In some cases, the operations of this step refer to, or may be performed by, circuitry for transmitting and/or code for transmitting as described with reference to FIG. 17.

Method 1300 then proceeds to step 1310 with transmitting a second element that provides information associated with at least one of the one or more TWT parameter sets indicated in the first element. In some cases, the operations of this step refer to, or may be performed by, circuitry for transmitting and/or code for transmitting as described with reference to FIG. 17.

In some aspects, the first station is affiliated with a MLD.

In some aspects, the first station comprises an AP.

In some aspects, the information indicates a time granularity for a TWT schedule.

In some aspects, the information indicates at least one of: signal bandwidth greater than a maximum signal bandwidth that can be indicated in the first element; bandwidth allocated to one or more different stations; a spatial multiplexing mode; a number of spatial streams; or one or more links to which the information applies to.

In some aspects, the method 1300 further includes receiving an indication that a second station supports the second element and the information, wherein the second element is transmitted based on the indication. In some cases, the operations of this step refer to, or may be performed by, circuitry for receiving and/or code for receiving as described with reference to FIG. 17.

In some aspects, the indication is received in one or more bits of a capabilities element. For example, as described above, the support of an extended TWT element and the operations related to it can be indicated by one or more bits. This indication can be carried in either the Extended Capabilities element or HE capabilities element or EHT capabilities element or (existing) TWT element or some other (new) element.

In some aspects, the information provided in the second element indicates TWT parameters for use by the second station in a TWT SP; and the first element indicates TWT parameters for use by one or more other stations that share the TWT SP with the second station.

In some aspects, the information indicates one or more other TWT parameters to use instead of or in addition to one or more TWT parameters in the TWT parameter sets indicated in the first element.

In some aspects, the information indicates TWT parameters for at least one of: an individual TWT mechanism, a broadcast TWT mechanism, a restricted TWT mechanism, or an off-channel TWT mechanism.

In some aspects, the information indicates TWT parameters for multiple TWT SPs; and the second element includes a TWT ID for each of the multiple TWT SPs.

In some aspects, the second element includes at least one TWT ID that matches a TWT ID in the first element and links the information to a TWT parameter set conveyed in the first element.

In some aspects, the first station transmits the second element based on, and only if, an indication is received that indicates at least a second station supports the second element.

In some aspects, the second element is transmitted in a broadcast frame.

In some aspects, the second element comprises an extended TWT parameter field that includes an extended TWT control field.

In some aspects, the extended TWT control field includes at least one of: a length field to indicate a length of subsequent fields in the extended TWT parameter field; or a bitmap to indicate fields that are included in the extended TWT parameter field.

In some aspects, the extended TWT control field includes a mode field to indicate at least one of: one or more TWT mechanisms to which parameters indicated in the extended TWT parameter field apply; or one or more modes of extensions for one or more of the TWT mechanisms.

Figure 17:
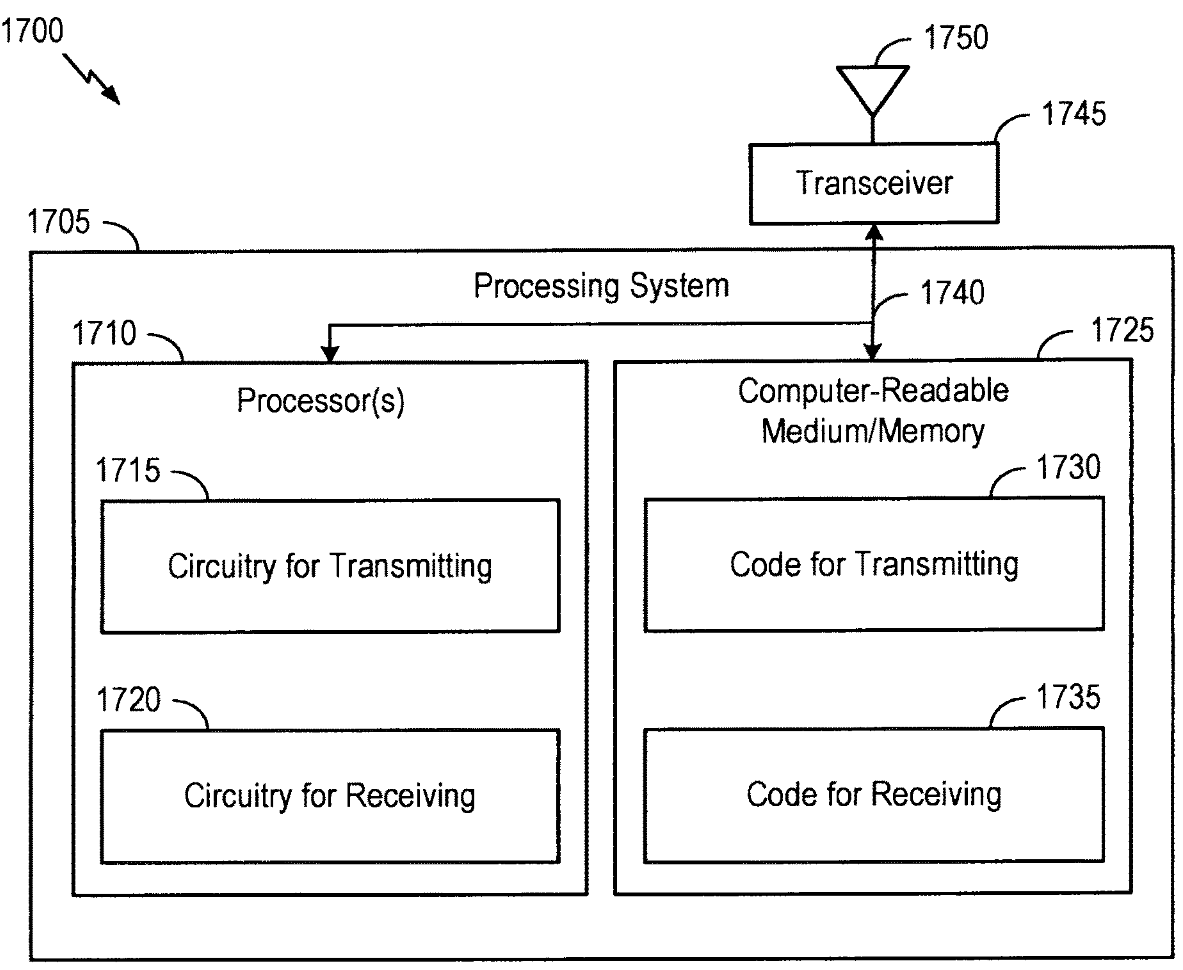
FIG. 17 depicts aspects of an example communications device.

In one aspect, method 1300, or any aspect related to it, may be performed by an apparatus, such as communications device 1700 of FIG. 17, which includes various components operable, configured, or adapted to perform the method 1300. Communications device 1700 is described below in further detail.

Note that FIG. 13 is just one example of a method, and other methods including fewer, additional, or alternative steps are possible consistent with this disclosure.

Figure 14:
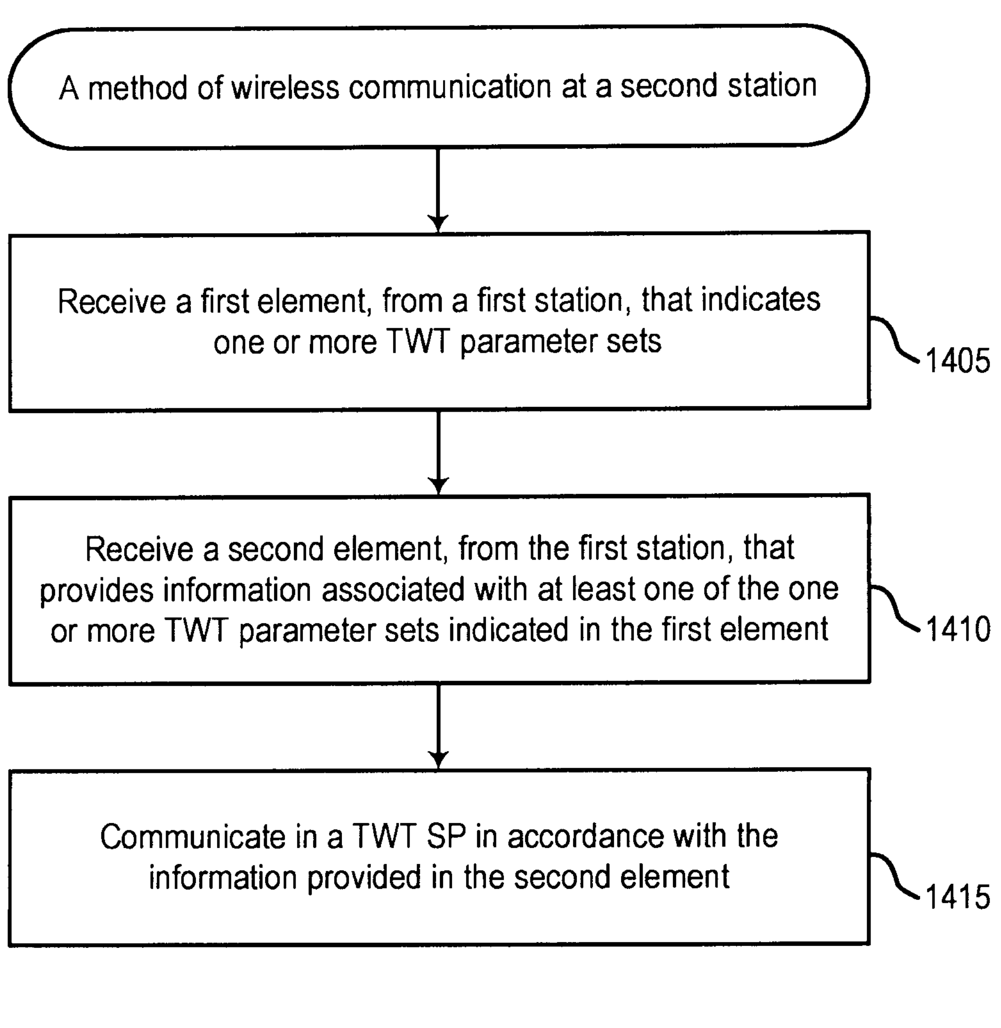
FIG. 14 depicts a method for wireless communications.

FIG. 14 shows an example of a method 1400 of wireless communication at a second station. In some examples, the second station is a STA 120 of FIGS. 1 and 2.

Method 1400 begins at step 1405 with receiving a first element, from a first station, that indicates one or more TWT parameter sets. In some cases, the operations of this step refer to, or may be performed by, circuitry for receiving and/or code for receiving as described with reference to FIG. 18.

Method 1400 then proceeds to step 1410 with receiving a second element, from the first station, that provides information associated with at least one of the one or more TWT parameter sets indicated in the first element. In some cases, the operations of this step refer to, or may be performed by, circuitry for receiving and/or code for receiving as described with reference to FIG. 18.

Method 1400 then proceeds to step 1415 with communicating in a TWT SP in accordance with the information provided in the second element. In some cases, the operations of this step refer to, or may be performed by, circuitry for communicating and/or code for communicating as described with reference to FIG. 18.

In some aspects, the second station is affiliated with a MLD.

In some aspects, the second station comprises a non AP station.

In some aspects, the additional information indicates a time granularity for a TWT field.

In some aspects, the additional information indicates at least one of: signal bandwidth greater than a maximum signal bandwidth that can be indicated in the first element; bandwidth allocated to one or more different stations; a spatial multiplexing mode; a number of spatial streams; or one or more links to which the additional information applies to.

In some aspects, the method 1400 further includes transmitting an indication that the second station supports the second element and the additional information provided therein. In some cases, the operations of this step refer to, or may be performed by, circuitry for transmitting and/or code for transmitting as described with reference to FIG. 18.

In some aspects, the indication is transmitted in one or more bits of a capabilities element. For example, as described above, the support of an extended TWT element and the operations related to it can be indicated by one or more bits. This indication can be carried in either the Extended Capabilities element or HE capabilities element or EHT capabilities element or (existing) TWT element or some other (new) element.

In some aspects, the second station shares the TWT SP with one or more other stations that communicate using one of the TWT parameter sets indicated in the first element.

In some aspects, the additional information indicates one or more other TWT parameters to use instead of or in addition to one or more parameters in the TWT parameter sets indicated in the first element.

In some aspects, the additional information indicates TWT parameters for at least one of: an individual TWT mechanism, a broadcast TWT mechanism, a restricted TWT mechanism, or an off-channel TWT mechanism.

In some aspects, the additional information indicates TWT parameters for multiple TWT SPs; and the second element includes a TWT ID for each of the multiple TWT SPs.

In some aspects, the second element includes at least one TWT ID that matches a TWT ID in the first element and links the additional information to a TWT parameter set conveyed in the first element.

In some aspects, the second element is received in a broadcast frame.

In some aspects, the second element comprises an extended TWT parameter field that includes an extended TWT control field.

In some aspects, the extended TWT control field includes at least one of: a length field to indicate a length of subsequent fields in the extended TWT parameter field; or a bitmap to indicate fields that are included in the extended TWT parameter field.

In some aspects, the extended TWT control field includes a mode field to indicate at least one of: one or more TWT mechanisms to which parameters indicated in the extended TWT parameter field apply; or one or more modes of extensions for one or more of the TWT mechanisms.

Figure 18:
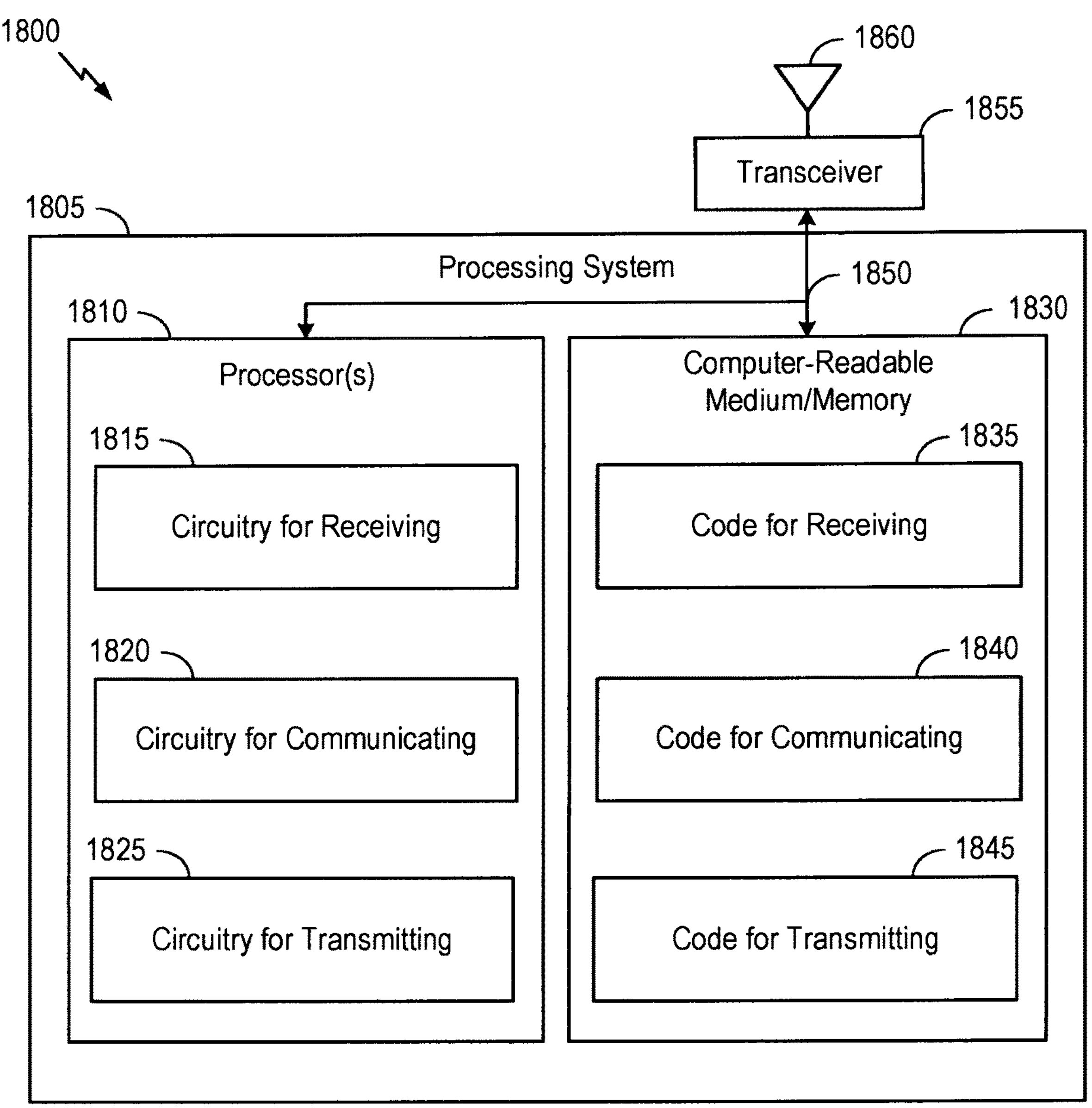
FIG. 18 depicts aspects of an example communications device.

In one aspect, method 1400, or any aspect related to it, may be performed by an apparatus, such as communications device 1800 of FIG. 18, which includes various components operable, configured, or adapted to perform the method 1400. Communications device 1800 is described below in further detail.

Note that FIG. 14 is just one example of a method, and other methods including fewer, additional, or alternative steps are possible consistent with this disclosure.

Figure 15:
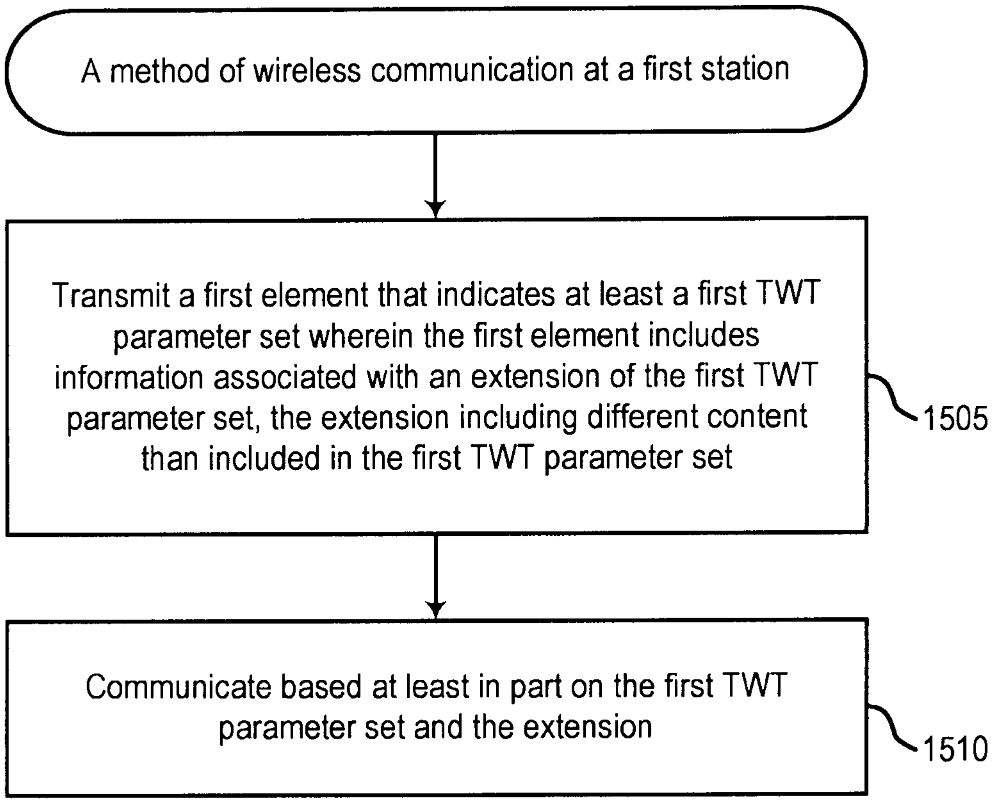
FIG. 15 depicts a method for wireless communications.

FIG. 15 shows an example of a method 1500 of wireless communication at a first station. In some examples, first station is an AP 110 of FIGS. 1 and 2.

Method 1500 begins at step 1505 with transmitting a first element that indicates at least a first TWT parameter set wherein the first element includes information associated with an extension of the first TWT parameter set, the extension including different content than included in the first TWT parameter set. In some cases, the operations of this step refer to, or may be performed by, circuitry for transmitting and/or code for transmitting as described with reference to FIG. 19.

Method 1500 then proceeds to step 1510 with communicating based at least in part on the first TWT parameter set and the extension. In some cases, the operations of this step refer to, or may be performed by, circuitry for communicating and/or code for communicating as described with reference to FIG. 19.

In some aspects, the information includes a TWT ID that links the extension to the first TWT parameter set.

In some aspects, the different content comprises one or more values for one or more parameters of the first TWT parameter set.

In some aspects, the different content comprises one or more parameters not included in the first TWT parameter set.

In some aspects, the first station is affiliated with a MLD.

In some aspects, the first station comprises an AP.

Figure 19:
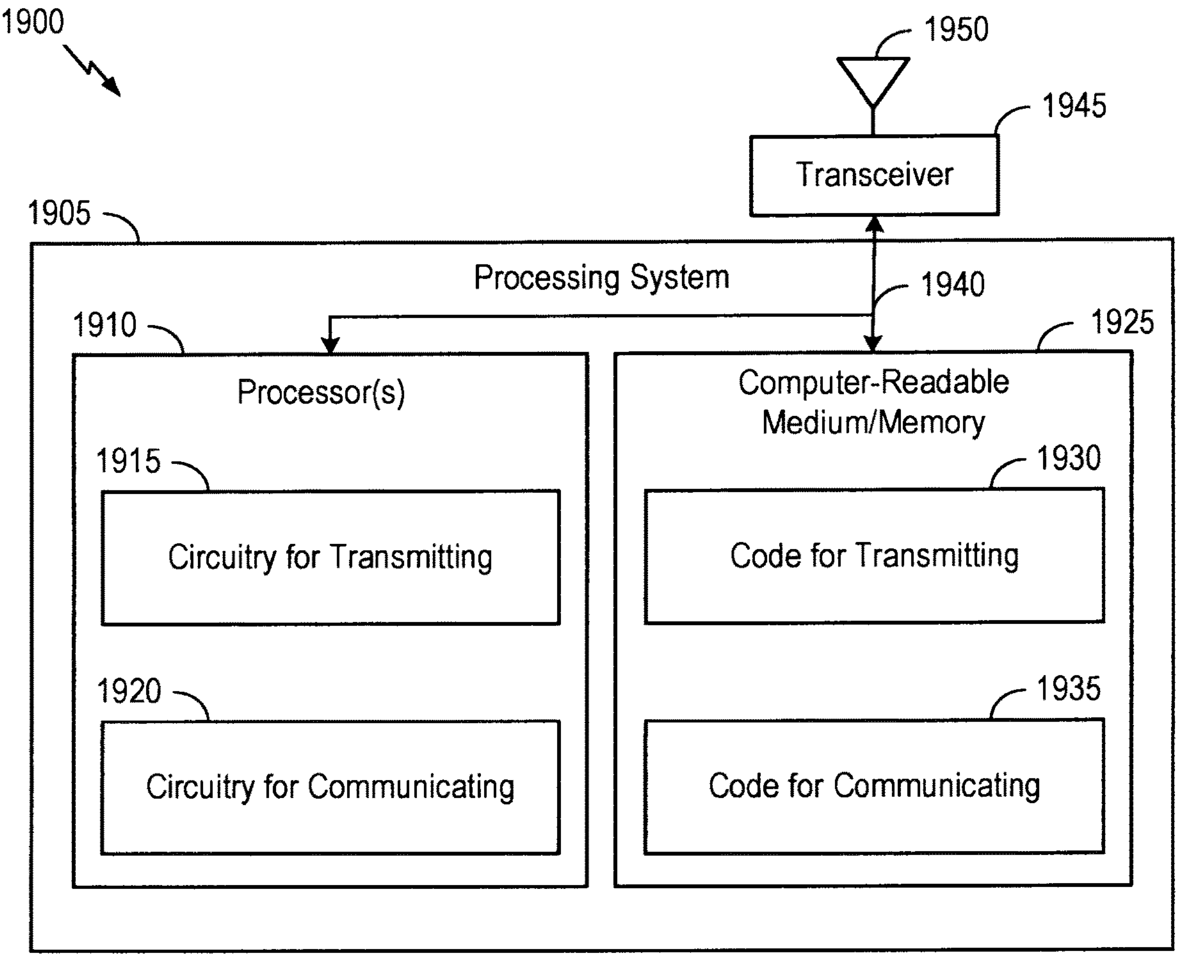
FIG. 19 depicts aspects of an example communications device.

In one aspect, method 1500, or any aspect related to it, may be performed by an apparatus, such as communications device 1900 of FIG. 19, which includes various components operable, configured, or adapted to perform the method 1500. Communications device 1900 is described below in further detail.

Note that FIG. 15 is just one example of a method, and other methods including fewer, additional, or alternative steps are possible consistent with this disclosure.

Figure 16:
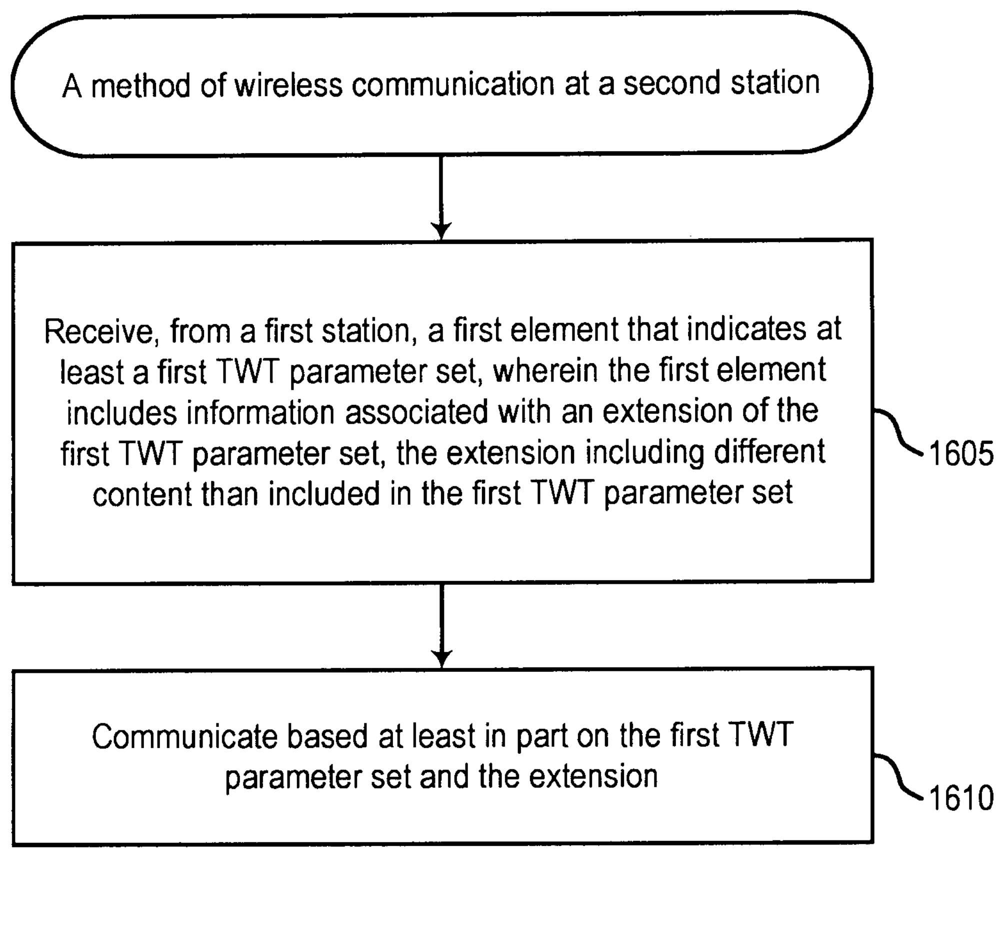
FIG. 16 depicts a method for wireless communications.

FIG. 16 shows an example of a method 1600 of wireless communication at a second station. In some examples, the second station is a STA 120 of FIGS. 1 and 2.

Method 1600 begins at step 1605 with receiving, from a first station, a first element that indicates at least a first TWT parameter set, wherein the first element includes information associated with an extension of the first TWT parameter set, the extension including different content than included in the first TWT parameter set. In some cases, the operations of this step refer to, or may be performed by, circuitry for receiving and/or code for receiving as described with reference to FIG. 20.

Method 1600 then proceeds to step 1610 with communicating based at least in part on the first TWT parameter set and the extension. In some cases, the operations of this step refer to, or may be performed by, circuitry for communicating and/or code for communicating as described with reference to FIG. 20.

In some aspects, the information includes a TWT ID that links the extension to the first TWT parameter set.

In some aspects, the different content comprises one or more values for one or more parameters of the first TWT parameter set.

In some aspects, the different content comprises one or more parameters not included in the first TWT parameter set.

In some aspects, the second station is affiliated with a MLD.

In some aspects, the second station comprises a non AP.

Figure 20:
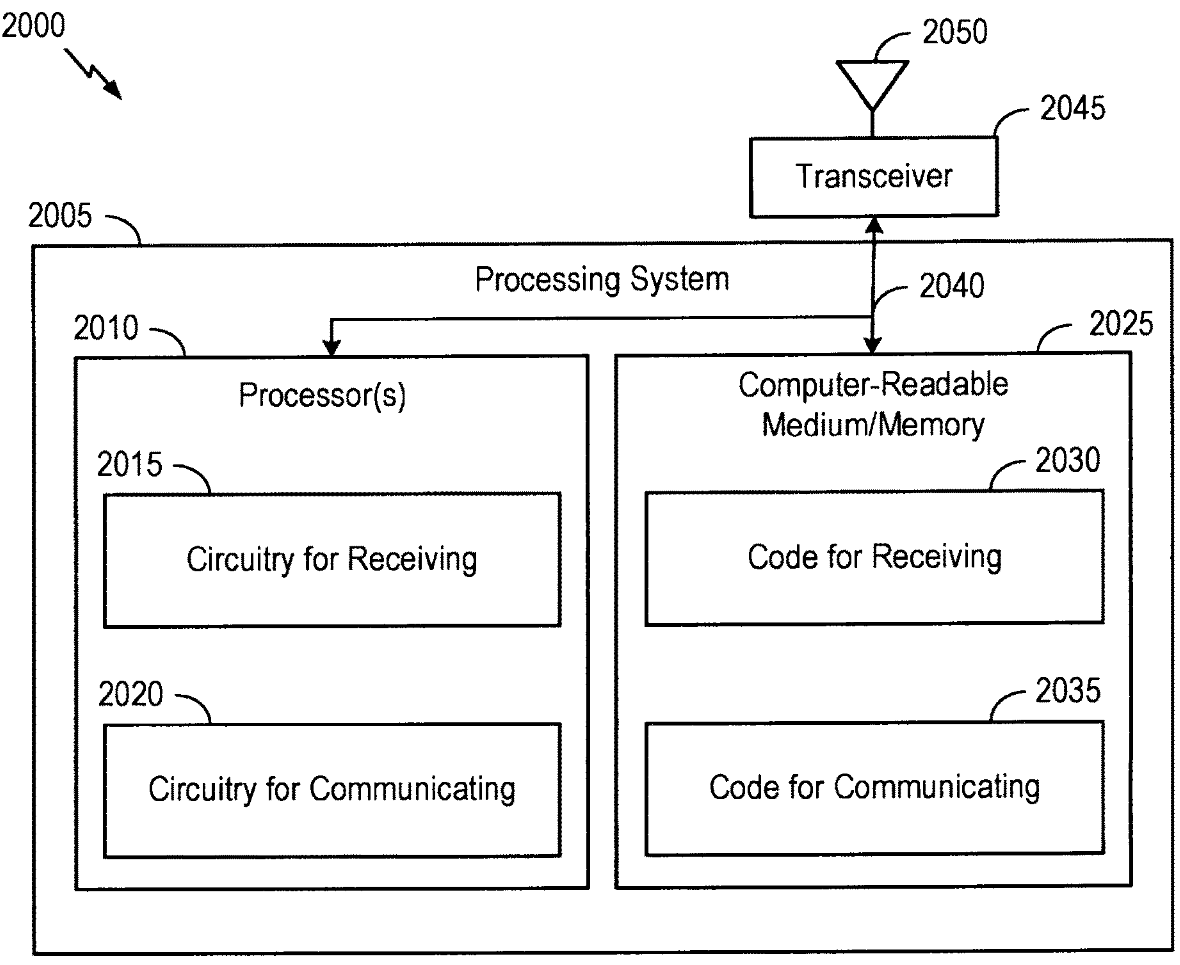
FIG. 20 depicts aspects of an example communications device.

In one aspect, method 1600, or any aspect related to it, may be performed by an apparatus, such as communications device 2000 of FIG. 20, which includes various components operable, configured, or adapted to perform the method 1600. Communications device 2000 is described below in further detail.

Note that FIG. 16 is just one example of a method, and other methods including fewer, additional, or alternative steps are possible consistent with this disclosure.

Example Communications Devices

FIG. 17 depicts aspects of an example communications device 1700. In some aspects, communications device 1700 is a station, such as a STA 120 described above with respect to FIGS. 1 and 2. In some aspects, communications device 1700 is an AP, such as an AP 110 described above with respect to FIGS. 1 and 2.

The communications device 1700 includes a processing system 1705 coupled to the transceiver 1745 (e.g., a transmitter and/or a receiver). The transceiver 1745 is configured to transmit and receive signals for the communications device 1700 via the antenna 1750, such as the various signals as described herein. The transceiver 1745 may be an example of aspects of transceiver 222 and/or transceiver 254 described with reference to FIG. 2. The processing system 1705 may be configured to perform processing functions for the communications device 1700, including processing signals received and/or to be transmitted by the communications device 1700.

The processing system 1705 includes one or more processors 1710. In various aspects, the one or more processors 1710 may be representative of the RX data processor 270, the TX data processor 288, the TX spatial processor 290, or the controller 280 of STA 120 illustrated in FIG. 2. In various aspects, the one or more processors 1710 may be representative of one or more of the RX data processor 242, the TX data processor 210, the TX spatial processor 220, or the controller 230 of AP 110 illustrated in FIG. 2. The one or more processors 1710 are coupled to a computer-readable medium/memory 1725 via a bus 1740. In certain aspects, the computer-readable medium/memory 1725 is configured to store instructions (e.g., computer-executable code) that when executed by the one or more processors 1710, cause the one or more processors 1710 to perform the method 1300 described with respect to FIG. 13, or any aspect related to it. Note that reference to a processor performing a function of communications device 1700 may include one or more processors 1710 performing that function of communications device 1700.

In the depicted example, computer-readable medium/memory 1725 stores code (e.g., executable instructions), such as code for transmitting 1730 and code for receiving 1735. Processing of the code for transmitting 1730 and code for receiving 1735 may cause the communications device 1700 to perform the method 1300 described with respect to FIG. 13, or any aspect related to it.

The one or more processors 1710 include circuitry configured to implement (e.g., execute) the code stored in the computer-readable medium/memory 1725, including circuitry such as circuitry for transmitting 1715 and circuitry for receiving 1720. Processing with circuitry for transmitting 1715 and circuitry for receiving 1720 may cause the communications device 1700 to perform the method 1300 described with respect to FIG. 13, or any aspect related to it.

Various components of the communications device 1700 may provide means for performing the method 1300 described with respect to FIG. 13, or any aspect related to it. For example, in some cases, means for transmitting, sending or outputting for transmission may include the transmitter unit 254 or antenna(s) 252 of the STA 120 illustrated in FIG. 2 and/or the transceiver 1745 and the antenna 1750 of the communications device 1700 in FIG. 17. In some cases, means for transmitting, sending or outputting for transmission may include the transmitter unit 222 or an antenna(s) 224 of AP 110 illustrated in FIG. 2 and/or the transceiver 1745 and the antenna 1750 of the communications device 1700 in FIG. 17. In some aspects, means for receiving or obtaining may include the receiver unit 254 or antenna(s) 252 of STA 120 illustrated in FIG. 2 and/or the transceiver 1745 and the antenna 1750 of the communications device 1700 in FIG. 17. In some aspects, means for receiving or obtaining may include the receiver unit 222 or an antenna(s) 224 of AP 110 illustrated in FIG. 2 and/or the transceiver 1745 and the antenna 1750 of the communications device 1700 in FIG. 17.

FIG. 18 depicts aspects of an example communications device 1800. In some aspects, communications device 1800 is a station, such as a STA 120 described above with respect to FIGS. 1 and 2.

The communications device 1800 includes a processing system 1805 coupled to the transceiver 1855 (e.g., a transmitter and/or a receiver). The transceiver 1855 is configured to transmit and receive signals for the communications device 1800 via the antenna 1860, such as the various signals as described herein. The transceiver 1855 may be an example of aspects of transceiver 254 described with reference to FIG. 2. The processing system 1805 may be configured to perform processing functions for the communications device 1800, including processing signals received and/or to be transmitted by the communications device 1800.

The processing system 1805 includes one or more processors 1810. In various aspects, the one or more processors 1810 may be representative of the RX data processor 270, the TX data processor 288, the TX spatial processor 290, or the controller 280 of STA 120 illustrated in FIG. 2. The one or more processors 1810 are coupled to a computer-readable medium/memory 1830 via a bus 1850. In certain aspects, the computer-readable medium/memory 1830 is configured to store instructions (e.g., computer-executable code) that when executed by the one or more processors 1810, cause the one or more processors 1810 to perform the method 1400 described with respect to FIG. 14, or any aspect related to it. Note that reference to a processor performing a function of communications device 1800 may include one or more processors 1810 performing that function of communications device 1800.

In the depicted example, computer-readable medium/memory 1830 stores code (e.g., executable instructions), such as code for receiving 1835, code for communicating 1840, and code for transmitting 1845. Processing of the code for receiving 1835, code for communicating 1840, and code for transmitting 1845 may cause the communications device 1800 to perform the method 1400 described with respect to FIG. 14, or any aspect related to it.

The one or more processors 1810 include circuitry configured to implement (e.g., execute) the code stored in the computer-readable medium/memory 1830, including circuitry such as circuitry for receiving 1815, circuitry for communicating 1820, and circuitry for transmitting 1825. Processing with circuitry for receiving 1815, circuitry for communicating 1820, and circuitry for transmitting 1825 may cause the communications device 1800 to perform the method 1400 described with respect to FIG. 14, or any aspect related to it.

Various components of the communications device 1800 may provide means for performing the method 1400 described with respect to FIG. 14, or any aspect related to it. For example, in some cases, means for transmitting, sending or outputting for transmission may include the transmitter unit 254 or antenna(s) 252 of the STA 120 illustrated in FIG. 2 and/or the transceiver 1855 and the antenna 1860 of the communications device 1800 in FIG. 18. In some aspects, means for receiving or obtaining may include the receiver unit 254 or antenna(s) 252 of STA 120 illustrated in FIG. 2 and/or the transceiver 1855 and the antenna 1860 of the communications device 1800 in FIG. 18.

FIG. 19 depicts aspects of an example communications device 1900. In some aspects, communications device 1900 is a station, such as a STA 120 described above with respect to FIGS. 1 and 2. In some aspects, communications device 1900 is an AP, such as an AP 110 described above with respect to FIGS. 1 and 2.

The communications device 1900 includes a processing system 1905 coupled to the transceiver 1945 (e.g., a transmitter and/or a receiver). The transceiver 1945 is configured to transmit and receive signals for the communications device 1900 via the antenna 1950, such as the various signals as described herein. The transceiver 1945 may be an example of aspects of transceiver 222 and/or transceiver 254 described with reference to FIG. 2. The processing system 1905 may be configured to perform processing functions for the communications device 1900, including processing signals received and/or to be transmitted by the communications device 1900.

The processing system 1905 includes one or more processors 1910. In various aspects, the one or more processors 1910 may be representative of the RX data processor 270, the TX data processor 288, the TX spatial processor 290, or the controller 280 of STA 120 illustrated in FIG. 2. In various aspects, the one or more processors 1910 may be representative of one or more of the RX data processor 242, the TX data processor 210, the TX spatial processor 220, or the controller 230 of AP 110 illustrated in FIG. 2. The one or more processors 1910 are coupled to a computer-readable medium/memory 1925 via a bus 1940. In certain aspects, the computer-readable medium/memory 1925 is configured to store instructions (e.g., computer-executable code) that when executed by the one or more processors 1910, cause the one or more processors 1910 to perform the method 1500 described with respect to FIG. 15, or any aspect related to it. Note that reference to a processor performing a function of communications device 1900 may include one or more processors 1910 performing that function of communications device 1900.

In the depicted example, computer-readable medium/memory 1925 stores code (e.g., executable instructions), such as code for transmitting 1930 and code for communicating 1935. Processing of the code for transmitting 1930 and code for communicating 1935 may cause the communications device 1900 to perform the method 1500 described with respect to FIG. 15, or any aspect related to it.

The one or more processors 1910 include circuitry configured to implement (e.g., execute) the code stored in the computer-readable medium/memory 1925, including circuitry such as circuitry for transmitting 1915 and circuitry for communicating 1920. Processing with circuitry for transmitting 1915 and circuitry for communicating 1920 may cause the communications device 1900 to perform the method 1500 described with respect to FIG. 15, or any aspect related to it.

Various components of the communications device 1900 may provide means for performing the method 1500 described with respect to FIG. 15, or any aspect related to it. For example, in some cases, means for transmitting, sending or outputting for transmission may include the transmitter unit 254 or antenna(s) 252 of the STA 120 illustrated in FIG. 2 and/or the transceiver 1945 and the antenna 1950 of the communications device 1900 in FIG. 19. In some cases, means for transmitting, sending or outputting for transmission may include the transmitter unit 222 or an antenna(s) 224 of AP 110 illustrated in FIG. 2 and/or the transceiver 1945 and the antenna 1950 of the communications device 1900 in FIG. 19. In some aspects, means for receiving or obtaining may include the receiver unit 254 or antenna(s) 252 of STA 120 illustrated in FIG. 2 and/or the transceiver 1945 and the antenna 1950 of the communications device 1900 in FIG. 19. In some aspects, means for receiving or obtaining may include the receiver unit 222 or an antenna(s) 224 of AP 110 illustrated in FIG. 2 and/or the transceiver 1945 and the antenna 1950 of the communications device 1900 in FIG. 19.

FIG. 20 depicts aspects of an example communications device 2000. In some aspects, communications device 2000 is a station, such as a STA 120 described above with respect to FIGS. 1 and 2.

The communications device 2000 includes a processing system 2005 coupled to the transceiver 2045 (e.g., a transmitter and/or a receiver). The transceiver 2045 is configured to transmit and receive signals for the communications device 2000 via the antenna 2050, such as the various signals as described herein. The transceiver 2045 may be an example of aspects of transceiver 254 described with reference to FIG. 2. The processing system 2005 may be configured to perform processing functions for the communications device 2000, including processing signals received and/or to be transmitted by the communications device 2000.

The processing system 2005 includes one or more processors 2010. In various aspects, the one or more processors 2010 may be representative of the RX data processor 270, the TX data processor 288, the TX spatial processor 290, or the controller 280 of STA 120 illustrated in FIG. 2. The one or more processors 2010 are coupled to a computer-readable medium/memory 2025 via a bus 2040. In certain aspects, the computer-readable medium/memory 2025 is configured to store instructions (e.g., computer-executable code) that when executed by the one or more processors 2010, cause the one or more processors 2010 to perform the method 1600 described with respect to FIG. 16, or any aspect related to it. Note that reference to a processor performing a function of communications device 2000 may include one or more processors 2010 performing that function of communications device 2000.

In the depicted example, computer-readable medium/memory 2025 stores code (e.g., executable instructions), such as code for receiving 2030 and code for communicating 2035. Processing of the code for receiving 2030 and code for communicating 2035 may cause the communications device 2000 to perform the method 1600 described with respect to FIG. 16, or any aspect related to it.

The one or more processors 2010 include circuitry configured to implement (e.g., execute) the code stored in the computer-readable medium/memory 2025, including circuitry such as circuitry for receiving 2015 and circuitry for communicating 2020. Processing with circuitry for receiving 2015 and circuitry for communicating 2020 may cause the communications device 2000 to perform the method 1600 described with respect to FIG. 16, or any aspect related to it.

Various components of the communications device 2000 may provide means for performing the method 1600 described with respect to FIG. 16, or any aspect related to it. For example, in some cases, means for transmitting, sending or outputting for transmission may include the transmitter unit 254 or antenna(s) 252 of the STA 120 illustrated in FIG. 2 and/or the transceiver 2045 and the antenna 2050 of the communications device 2000 in FIG. 20. In some aspects, means for receiving or obtaining may include the receiver unit 254 or antenna(s) 252 of STA 120 illustrated in FIG. 2 and/or the transceiver 2045 and the antenna 2050 of the communications device 2000 in FIG. 20.

Example Clauses

Implementation examples are described in the following numbered clauses:

Clause 1: A method of wireless communication at a first station, comprising: transmitting a first element that indicates one or more TWT parameter sets; and transmitting a second element that provides information associated with at least one of the one or more TWT parameter sets indicated in the first element.

Clause 2: The method of Clause 1, wherein the first station is affiliated with a MILD.

Clause 3: The method of any one of Clauses 1 and 2, wherein the first station comprises an AP.

Clause 4: The method of any one of Clauses 1-3, wherein the information indicates a time granularity for a TWT schedule.

Clause 5: The method of any one of Clauses 1-4, wherein the information indicates at least one of: signal bandwidth greater than a maximum signal bandwidth that can be indicated in the first element; bandwidth allocated to one or more different stations; a spatial multiplexing mode; a number of spatial streams; or one or more links to which the information applies to.

Clause 6: The method of any one of Clauses 1-5, further comprising: receiving an indication that a second station supports the second element and the information, wherein the second element is transmitted based on the indication.

Clause 7: The method of Clause 6, wherein the indication is received in one or more bits of a capabilities element.

Clause 8: The method of Clause 6, wherein: the information provided in the second element indicates TWT parameters for use by the second station in a TWT SP; and the first element indicates TWT parameters for use by one or more other stations that share the TWT SP with the second station.

Clause 9: The method of any one of Clauses 1-8, wherein the information indicates one or more other TWT parameters to use instead of or in addition to one or more TWT parameters in the one or more TWT parameter sets indicated in the first element.

Clause 10: The method of any one of Clauses 1-9, wherein the information indicates TWT parameters for at least one of: an individual TWT mechanism, a broadcast TWT mechanism, a restricted TWT mechanism, or an off-channel TWT mechanism.

Clause 11: The method of any one of Clauses 1-10, wherein: the information indicates TWT parameters for multiple TWT SPs; and the second element includes a TWT ID for each of the multiple TWT SPs.

Clause 12: The method of any one of Clauses 1-11, wherein: the second element includes at least one TWT ID that matches a TWT ID in the first element and links the information to a TWT parameter set conveyed in the first element.

Clause 13: The method of any one of Clauses 1-12, wherein the first station transmits the second element based on, and only if, an indication is received that indicates at least a second station supports the second element.

Clause 14: The method of any one of Clauses 1-13, wherein the second element is transmitted in a broadcast frame.

Clause 15: The method of any one of Clauses 1-14, wherein the second element comprises an extended TWT parameter field that includes an extended TWT control field.

Clause 16: The method of Clause 15, wherein the extended TWT control field includes at least one of: a length field to indicate a length of subsequent fields in the extended TWT parameter field; or a bitmap to indicate fields that are included in the extended TWT parameter field.

Clause 17: The method of Clause 15, wherein the extended TWT control field includes a mode field to indicate at least one of: one or more TWT mechanisms to which parameters indicated in the extended TWT parameter field apply; or one or more modes of extensions for one or more of the TWT mechanisms.

Clause 18: A method of wireless communication at a second station, comprising: receiving a first element, from a first station, that indicates one or more TWT parameter sets; receiving a second element, from the first station, that provides information associated with at least one of the one or more TWT parameter sets indicated in the first element; and communicating in a TWT SP in accordance with the information provided in the second element.

Clause 19: The method of Clause 18, wherein the second station is affiliated with a MLD.

Clause 20: The method of any one of Clauses 18 and 19, wherein the second station comprises an non AP station.

Clause 21: The method of any one of Clauses 18-20, wherein the additional information indicates a time granularity for a TWT field.

Clause 22: The method of any one of Clauses 18-21, wherein the additional information indicates at least one of: signal bandwidth greater than a maximum signal bandwidth that can be indicated in the first element; bandwidth allocated to one or more different stations; a spatial multiplexing mode; a number of spatial streams; or one or more links to which the additional information applies to.

Clause 23: The method of any one of Clauses 18-22, further comprising: transmitting an indication that the second station supports the second element and the additional information provided therein.

Clause 24: The method of Clause 23, wherein the indication is transmitted in one or more bits of a capabilities element.

Clause 25: The method of Clause 23, wherein: the second station shares the TWT SP with one or more other stations that communicate using one of the TWT parameter sets indicated in the first element.

Clause 26: The method of any one of Clauses 18-25, wherein the additional information indicates one or more other TWT parameters to use instead of or in addition to one or more parameters in the one or more TWT parameter sets indicated in the first element.

Clause 27: The method of any one of Clauses 18-26, wherein the additional information indicates TWT parameters for at least one of: an individual TWT mechanism, a broadcast TWT mechanism, a restricted TWT mechanism, or an off-channel TWT mechanism.

Clause 28: The method of any one of Clauses 18-27, wherein: the additional information indicates TWT parameters for multiple TWT SPs; and the second element includes a TWT ID for each of the multiple TWT SPs.

Clause 29: The method of any one of Clauses 18-28, wherein: the second element includes at least one TWT ID that matches a TWT ID in the first element and links the additional information to a TWT parameter set conveyed in the first element.

Clause 30: The method of any one of Clauses 18-29, wherein the second element is received in a broadcast frame.

Clause 31: The method of any one of Clauses 18-30, wherein the second element comprises an extended TWT parameter field that includes an extended TWT control field.

Clause 32: The method of Clause 31, wherein the extended TWT control field includes at least one of: a length field to indicate a length of subsequent fields in the extended TWT parameter field; or a bitmap to indicate fields that are included in the extended TWT parameter field.

Clause 33: The method of Clause 31, wherein the extended TWT control field includes a mode field to indicate at least one of: one or more TWT mechanisms to which parameters indicated in the extended TWT parameter field apply; or one or more modes of extensions for one or more of the TWT mechanisms.

Clause 34: A method of wireless communication at a first station, comprising: transmitting a first element that indicates at least a first TWT parameter set wherein the first element includes information associated with an extension of the first TWT parameter set, the extension including different content than included in the first TWT parameter set; and communicating based at least in part on the first TWT parameter set and the extension.

Clause 35: The method of Clause 34, wherein the information includes a TWT ID that links the extension to the first TWT parameter set.

Clause 36: The method of any one of Clauses 34 and 35, wherein the different content comprises one or more values for one or more parameters of the first TWT parameter set.

Clause 37: The method of any one of Clauses 34-36, wherein the different content comprises one or more parameters not included in the first TWT parameter set.

Clause 38: The method of any one of Clauses 34-37, wherein the first station is affiliated with a MLD.

Clause 39: The method of any one of Clauses 34-38, wherein the first station comprises an AP.

Clause 40: A method of wireless communication at a second station, comprising: receiving, from a first station, a first element that indicates at least a first TWT parameter set, wherein the first element includes information associated with an extension of the first TWT parameter set, the extension including different content than included in the first TWT parameter set; and communicating based at least in part on the first TWT parameter set and the extension.

Clause 41: The method of Clause 40, wherein the information includes a TWT ID that links the extension to the first TWT parameter set.

Clause 42: The method of any one of Clauses 40 and 41, wherein the different content comprises one or more values for one or more parameters of the first TWT parameter set.

Clause 43: The method of any one of Clauses 40-42, wherein the different content comprises one or more parameters not included in the first TWT parameter set.

Clause 44: The method of any one of Clauses 40-43, wherein the second station is affiliated with a MLD.

Clause 45: The method of any one of Clauses 40-44, wherein the second station comprises a non AP.

Clause 46: The method of any one of Clauses 1-33 wherein the second element is conveyed in an extended version of an existing TWT frame.

Clause 47: The method of any one of Clauses 34-43 wherein the extension of the first TWT parameter set is conveyed in an extended version of an existing TWT frame.

Clause 48: An apparatus, comprising: a memory comprising executable instructions; and a processor configured to execute the executable instructions and cause the apparatus to perform a method in accordance with any one of Clauses 1-45.

Clause 49: An apparatus, comprising means for performing a method in accordance with any one of Clauses 1-45.

Clause 50: A non-transitory computer-readable medium comprising executable instructions that, when executed by a processor of an apparatus, cause the apparatus to perform a method in accordance with any one of Clauses 1-45.

Clause 51: A computer program product embodied on a computer-readable storage medium comprising code for performing a method in accordance with any one of Clauses 1-45.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first station configured for wireless communication, the first station comprising:

a memory comprising processor-executable instructions; and one or more processors configured to execute the processor-executable instructions and cause the first station to:

transmit a first element that indicates one or more target wakeup time (TWT) parameter sets; and transmit a second element that provides information associated with at least one of the one or more TWT parameter sets indicated in the first element, wherein the second element comprises: an element identifier (ID) field; a length field; an element ID extension field; a control field; and a TWT information field that indicates the information associated with the at least one TWT parameter set, the information including one or more different TWT parameters than the one or more TWT parameter sets.

2. The first station of claim 1, wherein the first station is affiliated with a multi-link device (MLD).

3. The first station of claim 1, wherein the first station comprises an access point (AP).

4. The first station of claim 1, wherein the information indicates a time granularity for a TWT schedule finer than a time granularity that can be indicated in the first element.

5. The first station of claim 1, wherein the information indicates at least one of:

signal bandwidth greater than a maximum signal bandwidth that can be indicated in the first element;

bandwidth allocated to one or more different stations;

a spatial multiplexing mode;

a number of spatial streams; or one or more links to which the information applies to.

6. The first station of claim 1, wherein:

the one or more processors are further configured to execute the processor-executable instructions and cause the first station to receive an indication that a second station supports the second element and the information; and the second element is transmitted based on the indication.

7. The first station of claim 6, wherein the indication is received in one or more bits of a capabilities element.

8. The first station of claim 6, wherein:

the information provided in the second element indicates TWT parameters for use by the second station in a TWT service period (SP); and the first element indicates TWT parameters for use by one or more other stations that share the TWT SP with the second station.

9. The first station of claim 1, wherein the information indicates TWT parameters for at least one of: an individual TWT mechanism, a broadcast TWT mechanism, or an off-channel TWT mechanism.

10. The first station of claim 1, wherein:

the information indicates TWT parameters for multiple TWT SPs; and the second element includes a TWT identifier (TWT ID) for each of the multiple TWT SPs.

11. The first station of claim 1, wherein the second element includes at least one TWT identifier (TWT ID) that matches a TWT ID in the first element and links the information to a TWT parameter set conveyed in the first element.

12. The first station of claim 1, wherein the second element is transmitted in a broadcast frame.

13. The first station of claim 1, wherein the second element comprises an extended TWT parameter field that includes an extended TWT control field.

14. The first station of claim 13, wherein the extended TWT control field includes at least one of:

a length field to indicate a length of subsequent fields in the extended TWT parameter field; or a bitmap to indicate fields that are included in the extended TWT parameter field.

15. The first station of claim 13, wherein the extended TWT control field includes a mode field to indicate at least one of:

one or more TWT mechanisms to which parameters indicated in the extended TWT parameter field apply; or one or more modes of extensions for at least one of the one or more TWT mechanisms.

16. The first station of claim 1, wherein at least one of:

the length field indicates a length of the second element;

the control field indicates presence of the TWT information field and includes one or more reserved bits; and the information associated with the at least one TWT parameter set comprises an extension of the at least one TWT parameter set including the different TWT parameters.

17. The first station of claim 1, wherein the information indicates restricted TWT parameters.

18. The first station of claim 1, wherein:

the first element comprises a first TWT ID associated with the one or more TWT parameter sets; and the second element comprises a second TWT ID matching the first TWT ID.

19. A second station configured for wireless communication, the second station comprising:

a memory comprising processor-executable instructions; and one or more processors configured to execute the processor-executable instructions and cause the second station to:

receive a first element, from a first station, that indicates one or more target wakeup time (TWT) parameter sets;

receive a second element, from the first station, that provides information associated with at least one of the one or more TWT parameter sets indicated in the first element, wherein the second element comprises: an element identifier (ID) field; a length field; an element ID extension field; a control field; and a TWT information field that indicates the information associated with the at least one TWT parameter set, the information including one or more different TWT parameters than the one or more TWT parameter sets; and communicate in a TWT service period (SP) in accordance with the information provided in the second element.

20. The second station of claim 19, wherein the second station is affiliated with a multi-link device (MLD).

21. The second station of claim 19, wherein the second station comprises a non access point (AP) station.

22. The second station of claim 19, wherein at least one of:

the length field indicates a length of the second element;

the control field indicates presence of the TWT information field and includes one or more reserved bits; and the information associated with the at least one TWT parameter set comprises an extension of the at least one TWT parameter set including the different TWT parameters.

23. The second station of claim 19, wherein the information indicates restricted TWT parameters.

24. The second station of claim 19, wherein:

the first element comprises a first TWT ID associated with the one or more TWT parameter sets; and the second element comprises a second TWT ID matching the first TWT ID.

25. A first station configured for wireless communication, the first station comprising:

a memory comprising processor-executable instructions; and one or more processors configured to execute the processor-executable instructions and cause the first station to:

transmit a first element that indicates at least a first target wakeup time (TWT) parameter set, wherein the first element includes information associated with an extension of the first TWT parameter set, the extension including different parameters than included in the first TWT parameter set; and communicate based at least in part on the first TWT parameter set and the extension.

26. The first station of claim 25, wherein the information includes a TWT identifier (TWT ID) that links the extension to the first TWT parameter set.

27. The first station of claim 25, wherein the first station is affiliated with a multi-link device (MLD).

28. The first station of claim 25, wherein the first station comprises an access point (AP).

29. The first station of claim 25, wherein the first element comprises:

an element identifier (ID) field;

a length field;

an element ID extension field;

a control field; and a TWT information field that indicates the information associated with the extension of the first TWT parameter set.

30. The first station of claim 29, wherein at least one of:

the length field indicates a length of the first element;

the control field indicates presence of the TWT information field and includes one or more reserved bits.

31. The first station of claim 29, wherein the information indicates restricted TWT parameters.

32. A second station configured for wireless communication, the second station comprising:

a memory comprising processor-executable instructions; and one or more processors configured to execute the processor-executable instructions and cause the second station to:

receive, from a first station, a first element that indicates at least a first target wakeup time (TWT) parameter set, wherein the first element includes information associated with an extension of the first TWT parameter set, the extension including different TWT parameters than included in the first TWT parameter set; and communicate based at least in part on the first TWT parameter set and the extension.

33. The second station of claim 32, wherein the information includes a TWT identifier (TWT ID) that links the extension to the first TWT parameter set.

34. The second station of claim 32, wherein the first element comprises:

an element identifier (ID) field;

a length field;

an element ID extension field;

a control field; and a TWT information field that indicates the information associated with the extension of the first TWT parameter set.

35. The second station of claim 34, wherein at least one of:

the length field indicates a length of the first element;

the control field indicates presence of the TWT information field and includes one or more reserved bits.

36. The first station of claim 34, wherein the information indicates restricted TWT parameters.

* * * * *